United States Patent [19]

Chen et al.

[11] Patent Number: 5,554,398

[45] Date of Patent: Sep. 10, 1996

[54] PROCESS FOR MANUFACTURING REDUCED-FAT CHEDDAR CHEESE

[75] Inventors: Carol M. Chen; Mark E. Johnson, both of Madison, Wis.

[73] Assignee: Wisconsin Alumni Research Foundation, Madison, Wis.

[21] Appl. No.: 500,434

[22] Filed: Jul. 10, 1995

[51] Int. Cl.$^6$ ........................................ A23C 9/12
[52] U.S. Cl. ........................ 426/36; 426/34; 426/38; 426/582
[58] Field of Search ........................ 426/34, 36, 38, 426/39, 580, 582

[56] References Cited

U.S. PATENT DOCUMENTS

| | | | |
|---|---|---|---|
| 4,476,143 | 10/1984 | Czulak et al. | 426/40 |
| 5,080,913 | 1/1992 | Gamay | 426/39 |
| 5,225,220 | 7/1993 | Gamay | 426/39 |
| 5,378,479 | 1/1995 | Trecker et al. | 426/42 |
| 5,395,630 | 3/1995 | Gamay | 426/39 |
| 5,429,829 | 7/1995 | Ernster | 426/36 |

OTHER PUBLICATIONS

Van Slyke and Price, "Cheese," 1979, Ridgeview Publication Co., Atascondera, CA.
Banks et al., Nov. 1993, J. Soc. Diary Sci. 44:4 pp. 119–123.

*Primary Examiner*—Leslie Wong
*Attorney, Agent, or Firm*—DeWitt Ross & Stevens SC

[57] ABSTRACT

The present invention is drawn to a process for manufacturing reduced-fat cheeses. In particular, the present invention is a process for the manufacture of reduced-fat Cheddar cheese. The process is characterized in that the initial coagulum is cut at a firmer state than in conventional Cheddar cheeses, the whey is drained from the curds at a relatively high pH, and the pH is maintained at a high level at the time the curd is milled and salted. The curds are neither washed nor rinsed with water during the process.

22 Claims, 12 Drawing Sheets

PROCESS FOR MANUFACTURING REDUCED-FAT CHEDDAR CHEESE

FIELD OF THE INVENTION

The present invention relates to reduced-fat cheesemaking. In particular, the present invention is drawn to a process for manufacturing reduced-fat Cheddar cheese.

DESCRIPTION OF THE PRIOR ART

The art of cheesemaking truly is an ancient one. For instance, a Greek historian named Xenophon, born in 349 BC, wrote about a goat cheese that had been known for centuries in Greece. While the exact origins of cheesemaking are unknown, it is known that as civilization moved westward toward Rome, the art of cheesemaking followed. The Romans refined various cheesemaking techniques, and feasted upon curd cheeses, Limburger-type cheeses, soft cheeses, and smoked and salted cheeses.

The first true cheese factories were not constructed until the early 1800s, at Bern, Switzerland. The first American cheese factory was established in Rome, New York, in 1851, by an entrepreneur named Jesse Williams. Williams' factory churned out four 150 pound cheeses per day. Williams' cheese was a variety favored by early English colonialists, and which is still widely enjoyed today, namely, Cheddar cheese.

Cheddar cheese remains one of the most popular cheeses in the world. Its origins go as far back as the late 1500s, and its name is taken from the small village of Cheddar, in southern England. The distinct flavor of aged Cheddar cheese results in large part from the process of cheddaring, or cutting the drained curd into strips and allowing them to set at about 100° F. for around two hours. Other cheese recipes within the Cheddar family include Derby, and Leicester, two English cheeses with a taste and texture very similar to Cheddar cheese. Like Cheddar, these two cheeses are named for the English towns where they were originally produced.

The steps involved in making most hard cheeses, Cheddar included, include ripening the milk; renneting, cutting, cooking, and draining the curd; milling and salting, molding and pressing, drying, and aging. In the process of making a hard cheese, most of the water, lactose, and minerals from the milk starting product will be separated from the milk proteins and butterfat which make up the curd. A short explanation of these steps will aid in an understanding of the presently described cheesemaking process, and how it results in a tasty, yet reduced fat-content cheese.

The first step in making a hard cheese is the ripening of the milk (cow's milk, goat's milk, etc.). In this initial step, cheese starter culture containing active lactic acid-producing bacteria is added to warm milk. The bacteria of the cheese starter culture will consume lactose from the milk to produce lactic acid, thereby raising the acidity of the milk. This increase in acid level aids in the expulsion of whey from the curd, helps the rennet to coagulate the milk, helps preserve the final cheese, and aids in flavor development in the aging cheese.

As in all cheeses, and of particular relevance to the present invention, the increase in acid level in the milk must proceed at the proper rate. Too much or too little acid produced in the ripening step will both have an adverse effect on the final product.

After the milk has been ripened, a coagulant is added to the milk. Rennet is an animal-derived coagulant that is traditionally extracted from the fourth stomach of a calf or a young goat. Non-animal rennet substitutes are also commercially available. Rennet contains an enzyme called chymosin which has the property of causing milk to form a solid curd. Addition of rennet to the ripened milk causes the milk to solidify into a solid coagulum. In everyday parlance, this coagulum is generally referred to as the curd. The two terms shall be used synonymously herein.

Trapped within the mass of the coagulum are the butterfat and whey, which are then separated by the following cutting step.

When the coagulum is deemed to be sufficiently firm, it is cut into a larger plurality of roughly uniform pieces. Cutting the curd greatly increases its surface area, and allows the whey to separate from the curd. After being cut, the pieces of curd slowly lose whey and will shrink in size. This process is referred to as syneresis.

The cut curd is then gently heated and cooked to expel further liquid whey from the solid curd. During the cutting and cooking steps, the lactic acid-producing bacteria from the cheese starter culture are still actively increasing the acid level in the curds and whey. Again, the rate of acid production and the final amount of acid (and minerals) within the curd is very important to the taste and texture of the finished product.

Once the curds have been cooked, they are separated from the whey and gently drained.

In the production of many commercial reduced-fat Cheddar cheeses, the cheese curd is subjected to an additional step wherein the curd is washed with water (70° F., generally cooler than the temperature of the curd) after being separated from the curd and before salting. This has the effect of removing lactose from the curd, thereby preventing the formation of too much acid within the cheese. See, for instance, U.S. Pat. No. 4,476,143, issued 6 Oct. 1984, to Czulak et al. This washing step also adds moisture to the curd, thereby resulting in a smoother, higher moisture content cheese. However, washed-curd Cheddar cheeses are generally regarded as inferior because they fail to develop distinctive Cheddar flavor upon aging, and tend to have pasty organoleptic qualities.

In fact, it is interesting to note that Van Slyke and Price (in Cheese, 1979, Ridgeveiw Publication Co., Atascondera, Calif.) discussed washed-curd Cheddar cheese research completed in 1901 and 1912 that reported that the washed-curd process results in less flavor and poorer quality whole milk Cheddar cheese compared to a no-washed curd Cheddar cheese. In that research it was noted that addition of lactose to the washed-curd improved the flavor of the cured cheese but was not generally recommended.

After separating the curds and whey, the curds are milled (cut into small, roughly uniform pieces) and salted.

As noted by Banks et al., (J. Soc. Dairy Sci. November 1993, 44:4, pp. 119–123), salt content within reduced-fat Cheddar cheeses is very important for good flavor development and organoleptic properties. The authors here note that recent evidence suggests that fat reduction in reduced-fat cheeses is not, per se, the sole cause of sensory defects, such as differences in texture and the development of poor, atypical flavors, often encountered in reduced-fat Cheddars. Taste tests conducted by these authors revealed a more pronounced Cheddar flavor development at higher salt content. For the most mature of the cheeses tested, this reference reveals that the Cheddar flavor intensity of the highest salt cheeses attained an average organoleptic score characteristic of commercial cheese of normal fat content.

After salting and milling, the curds are then placed into a mold (hooped), and pressed to expel whey remaining within the curds. Hooping and pressing gives the cheese its final shape. After removal from the mold, the cheese must then be aged to acquire its distinctive flavor. For Cheddar cheeses, aging takes anywhere from three to six months to develop a medium aged Cheddar flavor.

As is generally known, while cheese is enjoyed by many, whole milk cheeses are notoriously high in fat content. Because of health concerns regarding a diet high in fat, many consumers, American consumers in particular, are reducing their dietary intake of fat. As a consequence, the consumption of reduced-fat cheeses is on the rise, and consumers are becoming more discriminating regarding the flavor and quality of reduced-fat cheeses.

As a result, cheese manufacturers who produce lower-fat cheese are primarily concerned with emulating the flavor, functional characteristics, and body and texture of the reference reduced-fat cheese type. Manufacturing reduced-fat Cheddar cheese requires modifying the conventional cheesemaking protocol to avoid a cheese that is dry, firm, and curdy, with little or no Cheddar flavor. As the milk fat level is reduced in cheese, the moisture and protein content are increased. To increase the moisture content of reduced-fat cheeses, syneresis of whey from the curd must be slowed. This is inherently difficult since a decrease in fat in the milk coagulum increases the rate of syneresis under the same manufacturing conditions.

As noted above, an effective and often-used method for increasing cheese moisture in Cheddar cheese involves washing or rinsing the curd with relatively cool water. This increases cheese moisture and yield by slowing the rate of curd syneresis and/or allowing the curd to absorb water. This technique, however, produces a poor quality reduced-fat Cheddar cheese which lacks flavor development and is prone to the development of off flavors.

SUMMARY OF THE INVENTION

In light of the above discussion, it is a principal aim of the present invention to provide a process for the production of reduced-fat cheeses which rival the flavor, fragrance, body, and organoleptic qualities of full-fat cheeses.

A further aim of the present invention is to provide a process for the production of reduced-fat Cheddar cheeses which rival the flavor, fragrance, body, and organoleptic qualities of full-fat Cheddar cheeses, and which develop good Cheddar flavor upon suitable aging.

Yet a further aim of the present invention is to provide a process for the production of reduced-fat cheeses which does not utilize washing or rinsing of the cheese curd in fresh water.

Still another aim of the present invention is to provide a process for the production of non-curd washed, reduced-fat cheeses which have increased storage life compared to commercially-available washed-curd reduced-fat cheeses.

Yet another aim of the present invention is to provide a process for the production of 50% reduced-fat Cheddar cheeses which rival the flavor, fragrance, body, and organoleptic qualities of full-fat cheeses.

The present invention is a process for the production of reduced-fat cheese which includes the following steps, taken in the order given: ripening milk with a starter culture to yield cheese milk; coagulating the cheese milk by adding a coagulant to yield a coagulum; cutting the coagulum at a firmness level not less than about firmness adjustment 2.2 (as determined by a hot wire coagulation measuring device); cooking the cut coagulum to form curds and whey; separating the curds from the whey, and proceeding directly to mill and salt the curds in the absence of any washing or rinsing of the curds in water; milling the curds; salting the curds at a pH not less than about 5.80; and pressing the curds.

More specifically, the present invention is a process for the production of reduced-fat Cheddar cheese comprising: ripening milk with a starter culture to yield cheese milk; coagulating the cheese milk by adding a coagulant to yield a coagulum; cutting the coagulum at a firmness level not less than about firmness adjustment 2.2. wherein firmness adjustment is a unitless number equal to cutting time divided by maximum coagulation rate of the cheese milk; cooking the cut coagulum to form curds and whey; separating the curds from the whey, and proceeding directly to cheddar, mill, and salt the curds in the absence of any washing or rinsing of the curds in water; cheddaring the curds; milling the curds; salting the curds at a pH not less than about 5.80; and pressing the curds.

More specifically still, the present invention is a process for the production of reduced-fat Cheddar cheese which consists essentially of the following steps: ripening milk with a mesophilic starter culture to yield cheese milk; coagulating the cheese milk by adding a coagulant to yield a coagulum; cutting the coagulum at a firmness level between about firmness adjustment 2.2 and firmness adjustment 3.4, wherein firmness adjustment is a unitless number equal to cutting time divided by maximum coagulation rate of the cheese milk; cooking the cut coagulum to form curds and whey; separating the curds from the whey, and proceeding directly to cheddar, mill, and salt the curds in the absence of any washing or rinsing of the curds in water; cheddaring the curds; milling the curds; salting the curds at a pH not less than about 5.80; and pressing the curds.

The presently described cheesemaking process is characterized in that the initial coagulum is cut at a firmer state than in conventional Cheddar cheeses, the whey is drained from the curds at a relatively high pH, and the pH is maintained at a high level at the time the curd is milled and salted.

Of particular importance to the present process is that the curds are not rinsed or washed in fresh water, nor is the whey diluted in any manner. The high curd firmness at cutting, and the high pH at both whey drainage and curd milling and salting results in a high moisture, reduced-fat cheese with good body and no off flavors. When making Cheddar cheeses in particular, the present cheesemaking process yields a reduced-fat cheese which has excellent organoleptic qualities, and develops a characteristic Cheddar flavor upon aging.

The present process also enhances the shelf life of the resultant cheeses as compared to commercially-available washed-curd reduced fat cheeses.

Specifically, the present invention is a process for the manufacture of reduced-fat cheeses which utilizes a slow mesophilic starter culture, a very firm milk coagulum at cutting, a high draining curd pH, and a high salting curd pH, with no curd washing or rinsing. The slow rate of acid development by the starter culture enables the curd to be drained, milled, and salted at higher than normal pH values. This results in a better tasting and more satisfying reduced-fat Cheddar cheese.

The slow starter activity is essential for draining and salting the curd at the desired pH. This is especially true when the process is practiced on an industrial scale, where processing times may be much longer. If the whey expelled from the curd is too acid, some of the buffering capacity of the curd will be lost, resulting in a cheese having low pH. It is important here not to confuse pH with acid content: a cheese which is high in acid can nevertheless have a relatively high pH provided the cheese has a sufficiently high buffering capacity.

Also, by hooping at a high pH, a considerable amount of sugar is fermented during the pressing stage. The resultant relative drop in pH aids in curd fusion. Additionally, the fermentation of the residual lactose lowers the red-ox (reduction/oxidation) potential of the finished cheese (i.e. less oxygen and more hydrogen in the aging cheese). It is widely believed that a low red-ox potential is a driving force behind the development of a high-quality Cheddar flavor. While washing the curds of a cheese before salting will remove lactose, thereby preventing an acid cheese, washing does not allow for the development of a low red-ox potential.

DETAILED DESCRIPTION OF THE INVENTION

Figure 1:
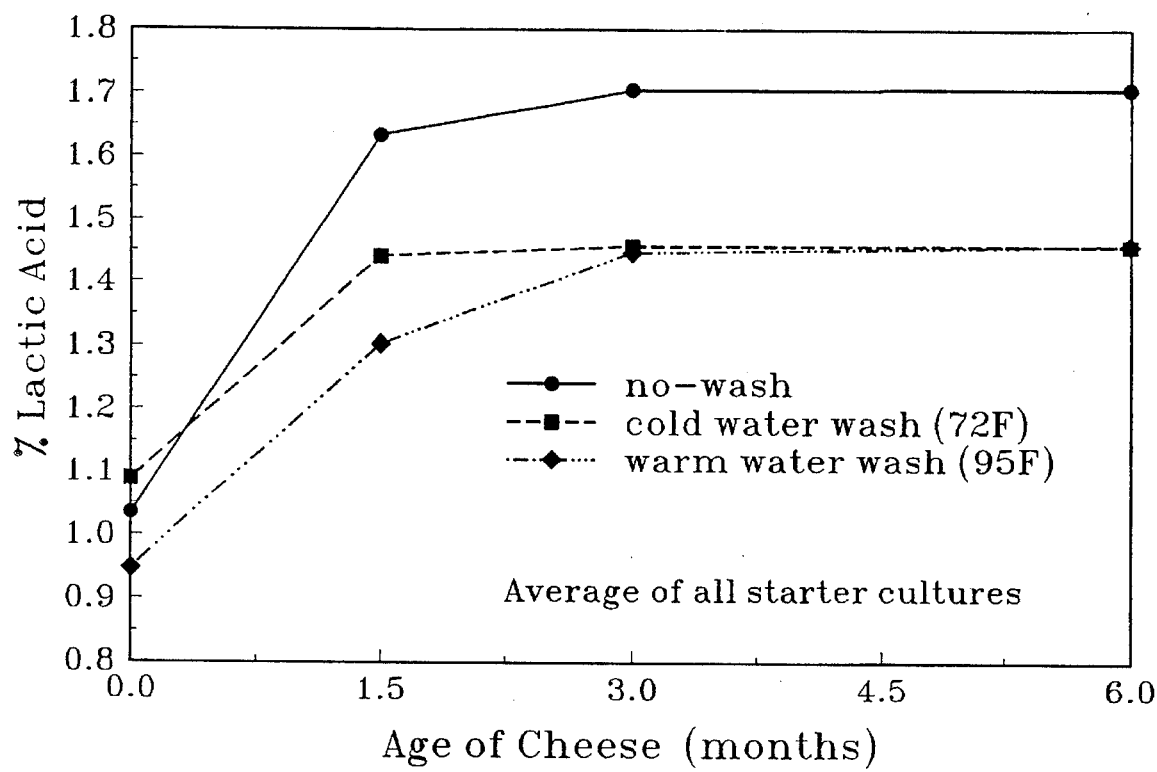
FIG. 1 is a graph illustrating a comparison of lactic acid for washed-curd and no-washed curd reduced-fat Cheddar cheeses over time.

The present process for producing reduced-fat cheese is characterized in that the initial coagulum is not cut until it is very firm. Upon addition of the coagulant, the cheese milk is allowed to set more than twice as long as conventional cheeses prior to cutting. Coagulum firmness can be measured on an objective scale (see below). However, in the present process it is preferred that the cheese milk set for up to 60 minutes prior to cutting the coagulum. This extremely firm coagulum at cutting yields correspondingly firm curds.

However, it takes more than just firm curds to make an organoleptically pleasing reduced-fat cheese. In order to assure that the resultant cheese is not overly acidic, the present process also utilizes a starter culture which has slow lactose-metabolizing activity. Slow starter activity is critical to ensure that the curds are drained and salted at the proper pH. For the present invention, the pH at salting is higher than that normally used for manufacturing cheese. In the present process, the curds are salted at a pH not lower than pH 5.8.

If the starter activity is too high, acid is produced very rapidly, and the whey expelled from the curds is relatively acidic. This results in loss of the buffering capacity of the cheese because minerals which are essential for buffering capacity are expelled with the whey. A slow rate of acid production, accomplished by using a starter culture with low activity, maintains the buffering capacity of the resultant cheese. A mesophilic starter is preferred.

Of critical importance to the present invention is that the curds are not washed with water after they are drained. As described above, washed-curd reduced-fat cheeses are generally inferior to no-wash cheeses because they lack flavor development, and do not age well. Washed-curd cheese often suffer from a body defect which gives them a pasty mouthfeel. The present process does not wash or rinse the curds in any fashion, nor does it dilute the whey in any fashion.

After the curds have been cut, cooked, and drained, the present process mills and salts the curds at an elevated pH, preferably not less than pH 5.8. At this pH, a considerable amount of lactose still remains in the curd, at will be fermented during the pressing of the curd. It is this high pH at milling and salting that is believed to give cheeses made using the present process their pleasing mouthfeel. The sugar fermented during pressing causes a relative drop in the pH over time, which aids in curd fusion.

The present process can produce cheese which are "reduced-fat," as that term has been defined by the Food and Drug Administration (i.e. not more than 15.25% fat). The process yields cheeses which have excellent organoleptic qualities, and, in the case of Cheddars, cheeses which develop an pleasing aged Cheddar flavor over time.

DESCRIPTION OF THE PREFERED EMBODIMENT

The preferred embodiment of the present invention is most easily and clearly illustrated by describing a cheese production run utilizing the present process, and comparing the cheese so formed with a cheese formed by traditional methods. The following is a description of a typical manufacturing run utilizing the present process.

Cheese Manufacturing

An outline of the preferred cheese manufacturing schedule used in the present process is shown in Table 1. Twenty-four vats of 50% reduced-fat Cheddar cheese were manufactured in the University of Wisconsin—Madison Pilot Dairy Processing Area by a licensed Wisconsin cheesemaker between September and April 1994. Raw whole milk was skimmed to approximately 1.3% fat, pasteurized at 73.3° C. for 16 seconds and stored overnight at 3° C. The next morning, 250 kilogram portions of milk were pumped into cheese vats, heated to 43.3° C. and cooled to 32.2° C. Starter culture, a single strain of *Lactococcus lactis* subsp. *cremoris* (D11, Rhône-Poulenc, Madison, Wis.) was grown in LF media (Rhône-Poulenc) as described by the manufacturer, and inoculated into the cheese milk at a rate of 1.25% (w/w). Five minutes before addition of the milk coagulant, 49 ml of calcium chloride solution (Rhône-Poulenc) was added. A double-strength, fermentation-produced chymosin (Chymax, Pfizer, Inc., Milwaukee, Wis.) was added at a rate of 19 ml per vat. On the first cheesemaking day, the first vat was cut at a coagulum firmness typical of reduced-fat Cheddar. Subsequent vats were cut at 2× and 3× times the cutting time of the first vat. The subsequent vats are the preferred embodiment of the present invention, with the 3× vats being the most preferred. The first vat is for comparison only. A hot platinum wire system (OPTI-SET, Stoelting Corporation, Kiel, Wis.) was used to monitor the rate of gel firming to ensure that each vat was cut at a specific gel firmness.

The OPTI-SET apparatus includes a hot platinum wire that is immersed in milk and heated with constant direct current. When the milk is liquid, the heat dissipates quickly, and the temperature of the platinum wire remains constant. The temperature of the platinum wire begins to increase as the milk first coagulates. Increasing temperature within the wire mirrors the increasing firmness of the coagulum. The hot platinum wire is an advantageous means of measuring the coagulum firmness because it is a nondestructive, continuous, and objective measurement.

The OPTI-SET apparatus measures the first coagulation, the maximum coagulation rate, and the actual cutting time. The apparatus defines a numerical index of milk coagulum firmness as a unitless number called the firmness adjustment.

TABLE 1

Cheese manufacturing protocol for 50% reduced-fat Cheddar cheese cut at different milk coagulum firmness levels.

| Operation | Coagulum firmness | | | pH |
| --- | --- | --- | --- | --- |
| | 1× | 2× | 3× | |
| | (min) | | | |
| Initial milk | | | | 6.61 |
| Add starter | 0 | 0 | 0 | 6.56 |
| Add coagulant | 45 | 20 | 5 | 6.54 |
| Cut | 68 | 71 | 72 | 6.50 |
| Reach cook temperature and drain | 103 | 106 | 105 | 6.35 |
| Mill | 201 | 197 | 200 | 5.91 |
| Add salt | 216 | 212 | 215 | 5.82 |

The firmness adjustment is calculated by dividing the actual cutting time by the maximum coagulation rate. From the first day of cheesemaking, the firmness adjustment values were calculated, programmed into the Opti-Set apparatus, and used to determine milk coagulum cutting times for all subsequent cheese manufacturing. Firmness adjustment values of 1.3, 2.2., and 3.4 correlated with actual cutting times of 23.4, 51.2, and 67.2 minutes, respectively. These data are shown in Table 2.

TABLE 2

Mean milk coagulum firmness as described by a Stoelting Opti-set unit.

| Actual cutting time | Maximum coagulation rate | Firmness adjustment[1] |
| --- | --- | --- |
| (min) | | |
| 23.4 ± 1.2 | 17.8 ± 1.2 | 1.3 ± .04 |
| 51.2 ± 5.2 | 23.9 ± 2.5 | 2.2 ± .1 |
| 67.2 ± 6.3 | 22.8 ± 6.5 | 3.4 ± .1 |

[1]Firmness adjustment = actual cutting time divided by maximum coagulation rate.

Milk ripening times were varied to assure that all treatments were cut, drained, milled, and salted at the same time and the same curd pH. The milk coagulum was cut with 0.95 centimeter knives at a milk pH of approximately 6.5, about 70 minutes from starter addition. For all three milk coagulum firmness levels, curd was allowed a 5-minute heal time followed by 10 minutes of gentle agitation before heating. The temperature of the curd-whey slurry was raised from 32.2° C. to 37.8° C. over 25 minutes. A curd strainer was then inserted into the vat and the whey slowly drained. There was no stir-out of the curds, and the curds were neither washed nor rinsed. Cheese slabs were Cheddared and then milled at a curd pH of about 5.9. 15 minutes after milling, the curd was salted in 3 additions spaced 5 minutes apart, at a rate of 1.25 grams of flake salt per 1 kilogram of milk. The curd was packed into 9-kg Wilson-style hoops, and pressed for 4 hours at ambient temperature. The cheese blocks were then weighed, sampled, vacuum packed, and stored at 7° C. for the duration of aging.

Analysis

All compositional tests were completed in duplicate and averaged. Whey samples were collected 5 minutes after the start of draining, press whey samples are a composite of whey collected from milling through the pressing of the cheese. Milk, whey, and press whey samples were analyzed for fat by the method of Mojonnier, protein (total % N×6.38) by the Kjeldahl method, and casein by the International Dairy Federation procedure. Milk was also tested for non-protein nitrogen (NPN) by analytically weighing a 15 g sample and mixing it with 5 g 49% trichloroacetic acid (TCA). After 30 minutes at room temperature, the mixture was filtered through Whatman #1 filter paper. The clear filtrate was analytically weighed and protein (% N×6.38) determined by the Kjeldahl method. Cheese was analyzed for moisture by vacuum oven, fat by the Babcock method, pH by the quinhydrome method, and salt content (Model 926, Corning Glass Works, Medfield, Mass.). These analytical methods are all well known to those in the art. For instance, see Association of Official Analytical Chemists, 1990, Official Methods of Analysis, 15th ed., AOAC, Washington, D.C.; International Daily Federation, 1964, Determination of the Casein Content of Milk, Int. Dairy Fed. Standard 29, Int. Dairy Fed., Brussels, Belgium; Johnson and Olson, 1985, A Comparison of Available Methods for Determining Salt Levels in Cheese, J. Dairy Sci. 68: 1020; and Marth, 1978, Standard Methods for the Examination of Dairy Products 14th ed., American Public Health Assoc., Washington, D.C., all of which are incorporated herein by reference for their teachings of standardized methods for analyzing dairy products.

Cheese Yield Calculations

Milk was weighed to ±0.2 kg (Model 31-1822-FD, Toledo Scale Company, Toledo, Ohio). Press whey (collected after milling of the cheese curd through pressing) was weighed to ±0.001 kg (Mettler PJ6, Mettler Instrument Corp., Highstown, N.J.). Cheese was weighed to ±0.045 kg (model 2071, Toledo Scale Company, Toledo, Ohio).

The weight of the whey was determined by subtracting the weight of the milk minus the weight of the cheese and press whey. If a complete mass balance is not completed, percentage of fat recovered in the cheese based on cheese composition was found to be more accurate than calculations based on fat losses in the whey. The percentage of fat and nitrogen in the cheese equals the total amount of fat or nitrogen in the cheese divided by the total amount of fat or nitrogen in the milk. R values represent the non-fat solids in the cheese, and includes lactic acid, salt, whey proteins, and any differences in casein recovery (since all treatments assumed a 96% casein recovery). R values are calculated by known methods. (See the references incorporated by reference, immediately above.) Actual cheese yield percentage for each vat was calculated by dividing the weight of the cheese after pressing by the total weight of milk.

Sensory Evaluation

Three 50% reduced-fat Cheddar cheeses made from the same lots of milk were evaluated by descriptive taste panels at 3 and 6 months of ripening. Descriptive taste panels consisted of 6–10 experienced judges who evaluated the cheese for flavor and body characteristics using category scaling. For flavor analysis the following attributes were evaluated: Cheddar Flavor Intensity (1=none, 7=aged), acid flavor intensity (1=flat, 7=pronounced), bitter and off flavor intensity (1=none, 7=pronounced), and overall flavor preference (1=dislike very much, 7=like very much). Body and Texture analysis included the following attributes: Body (1=very soft, 7=very firm), Body Breakdown (1=very curdy, 7=very smooth), and overall body and texture preference (1=dislike very much, 7=like very much).

The judges first tasted the reference (cheeses made with a firmness adjustment of 1.3), and the group gave it a consensus rating in all categories except for flavor and body and texture preference. A scorer marked the consensus rating on a ballot sheet, and a copy of the marked ballot sheet was given to each panelist. Random numbers were assigned to the cheeses, and the judges tasted them on a blind basis. Cheeses were scored for all attributes using the reference (consensus) as a guideline.

Experimental Design and Statistical Analysis

On a single cheesemaking day, 3 vats of 50% reduced-fat Cheddar were manufactured using 1 lot of milk split into 3 portions. Each day all different firmness adjustments were tested simultaneously, with the order of testing being randomly selected. Cheesemaking was replicated eight times for a total of 24 vats of cheese.

Statistical analysis for cheese composition, sensory analysis and cheese yield were completed by the statistical method described by Emmons and Binns (1994, Cheese Yield Experiments and Proteolysis by Milk Clotting Enzymes, J. Dairy Sci, 73:2028, incorporated herein by reference for its teaching of statistical methods of analysis) using an SAS system (SAS Institute, Cary, N.C.). The independent variables in the model were cheesemaking day and firmness adjustment. Cheesemaking day reflects differences due mainly to differences in milk composition. Standard error of the means (SEM) was derived from the error mean square term of the ANOVA. Regardless of the F value, a Fisher's Protected LSD was calculated to evaluate the differences between treatment means.

DISCUSSION

Milk Composition

Twenty-four vats of 50% reduced-fat Cheddar were manufactured using 8 lots of milk. The fat, solids, protein, non-protein nitrogen (NPN), casein, and non-casein N are presented in Table 3. All of the cheese manufactured was made using milk that was standardized to a fat content of approximately 1.3%. Standardization was accomplished by removing cream from whole milk. Alternative methods of milk standardization, such as the addition of non-fat dry milk, function with equal success.

Cheese Manufacturing

Total cheesemaking time from starter to addition to salting was completed in roughly 3 hours and 35 minutes (Table 1, 215 minutes). To ensure that all treatments were cut, drained, milled, and salted at the same time and curd pH, milk ripening times were varied. The standardization of draining and milling times at equivalent curd pH values is essential because variations in pH may influence cheese moisture levels in reduced-fat Cheddar.

TABLE 3

| Mean composition of standardized milk used in cheesemaking. | | |
|---|---|---|
| Analysis | Mean | SD |
| | (%) | |
| Fat | 1.29 | .041 |
| Solids | 10.10 | .15 |
| Total protein[1] | 3.26 | .047 |
| Non-protein N[1] | .23 | .012 |
| True protein[2] | 3.03 | .041 |
| Non-casein N[1] | .73 | .017 |
| Casein[3] | 2.53 | .048 |
| Casein:Fat ratio[4] | 1.96 | .07 |

[1] N times 6.38.
[2] True protein = total protein − non-protein N.
[3] Casein = total protein − non-casein N.
[4] Percentage of casein divided by percentage of fat.

Cheese and Whey Composition

Cheese composition at Day 3 and pH values through 6 months of aging are given in Tables 4 and 5, respectively. As is clearly shown by Table 4, cheeses cut at a firmness adjustment of 1.3, which is the firmness at cut of a typical full-fat Cheddar cheese, were significantly lower in moisture (46.44%) than cheeses cut at firmness adjustments of 2.2 (48.29%) and 3.4 (48.90%).

TABLE 4

Mean cheese composition for 50% reduced-fat Cheddar cheese cut at different milk coagulum firmness levels.

| Firmness adjustment | Moisture | Fat | Protein[1] | Salt | MNFS[2] | FDM[3] | S/M[4] |
|---|---|---|---|---|---|---|---|
| | (%) | | | | | | |
| 1.3 | 46.44[c] | 14.7[a] | 33.08[a] | 1.77[a] | 54.42[b] | 27.4[a] | 3.81[a] |
| 2.2 | 48.29[b] | 14.2[b] | 31.04[b] | 1.75[a] | 56.27[a] | 27.4[a] | 3.62[a] |
| 3.4 | 48.90[a] | 13.9[c] | 30.92[b] | 1.61[b] | 56.76[a] | 27.1[b] | 3.29[b] |
| Statistics SEM | .17 | .06 | .17 | .041 | .17 | .09 | .088 |
| P-value | .0001 | .0001 | .0003 | .03 | .0001 | .04 | .003 |
| LSD | .50 | .2 | .50 | .12 | .52 | .3 | .26 |

[a,b]Means in the same column having different superscripts are significantly different by (P < .05) based on least significant difference (LSD).
[1]N times 6.38
[2]Moisture in the non-fat substance
[3]Fat in the dry matter
[4]Salt in the moisture phase

TABLE 5

Mean cheese pH for 50% reduced-fat Cheddar cheese cut at different milk coagulum firmness levels over time.

| Firmness adjustment | Age of cheese | | | | |
|---|---|---|---|---|---|
| | .5 | 2 | 6 | 13 | 26 |
| | (weeks) | | | | |
| 1.3 | 5.39[a] | 5.18[a] | 5.21[a] | 5.18[a] | 5.22[a] |
| 2.2 | 5.33[ab] | 5.10[ab] | 5.05[b] | 5.04[b] | 5.13[b] |
| 3.4 | 5.28[b] | 5.04[b] | 5.04[b] | 5.00[b] | 5.10[b] |
| Statistics SEM | .022 | .031 | .022 | .018 | .021 |
| P-value | .01 | .01 | .0001 | .0001 | .002 |
| LSD | .066 | .094 | .066 | .052 | .064 |

[a,b]Means in the same column having different superscripts are significantly different by (P < .05) based on least significant difference (LSD).

Concomitantly, significant differences were also noted in cheese fat, protein, and salt contents in the cheese. After 2 weeks of aging, cheeses with higher moisture content were significantly lower in pH. (See Table 5.) Since the cheeses were drained at identical curd pH values, the buffer capacity of the curd would be equivalent. Thus, the lower pH values can be attributed to more trapped lactose in the curd and the subsequent fermentation of sugar by starter and non-starter organisms.

Values for whey and press whey composition are presented in Table 6. Percentage of whey total protein (0.89% to 0.91%) and press whey total protein (0.91% to 0.93%) were not seen to differ as a result of the milk coagulum firmness levels at cutting.

TABLE 6

Mean whey and press whey composition for 50% reduced-fat Cheddar cheese cut at different coagulum firmness levels.

| Firmness adjustment | Whey fat | Whey total protein[1] | Press whey fat | Press whey total protein[1] |
|---|---|---|---|---|
| | (%) | | | |
| 1.3 | .16[a] | .91 | .39[a] | .91 |
| 2.2 | .16[a] | .90 | .35[b] | .91 |
| 3.4 | .17[b] | .89 | .34[b] | .93 |
| Statistics | .0036 | .0081 | .0082 | .014 |

TABLE 6-continued

Mean whey and press whey composition for 50% reduced-fat Cheddar cheese cut at different coagulum firmness levels.

| Firmness adjustment | Whey fat | Whey total protein[1] | Press whey fat | Press whey total protein[1] |
|---|---|---|---|---|
| SEM | | | | |
| P-value | .007 | .35 | .005 | .72 |
| LSD | .011 | .024 | .025 | .041 |

[a,b]Means in the same column having different superscripts are significantly different by (P < .05) based on least significant difference (LSD).
[1]% N times 6.38

However, significant differences were noted in the actual percentage of fat in the whey and press whey. The percentage of whey fat was highest in cheeses cut at a firmness adjustment of 3.4, while percentage of press whey fat was highest in the cheeses cut at a firmness adjustment of 1.3. Comparing the percentage of fat in the whey and press whey in the manufacture of 50% reduced-fat Cheddar according to the present process to that of full-fat Cheddar using the same cheese manufacturing equipment indicates that the present process yields whey and press whey which have approximately 50% and 25% of the fat concentration of full-fat Cheddar, respectively.

It must be noted, however, that significant differences in the percentage of fat or protein due to milk coagulum firmness levels can be misleading when evaluating only the concentration of fat or protein. The concentration of fat or protein can change depending on the moisture content of the cheese or the solids content of the whey. To add reliability to the measurements, differences in the percentage of fat or protein recovered in the cheese as a percent of the total amount of fat or protein in the cheese milk should also be assayed.

Fat, Protein and Solids-non-fat Recovery

Actual weights (milk, cheese, and press whey), calculated weights (weight of whey was calculated by milk weight minus cheese and press whey weight), and actual percentages of nitrogen and fat in the milk, whey, press whey, and cheese were used to calculate the nitrogen and fat recoveries. These results are provided in Table 7.

The total percentage of nitrogen and fat recovered was found to be slightly greater than 100%. No significant differences were seen in the total percentage of either fat or protein recovered.

The nitrogen and fat content of the whey was determined from a whey sample collected 5 minutes after the start of draining. The composition of the whey changes slightly throughout the draining process; whey exiting late in draining, during packing and cheddaring, has a lower solids content. A previous unpublished study has demonstrated that early collection of whey samples results in an overestimation of whey fat. (Chen et al., 1995, submitted for publication J. Dairy Sci.) This study clearly emphasizes the importance of collecting a composite whey sample in yield experiments.

The milk coagulum firmness at cutting directly affects the rate at which whey is expelled from the curd, as shown by significant differences in the mean weights of the whey and press whey. The lowest firmness adjustment at cutting resulted in the greatest amount of whey lost and the least amount of press whey collected. At a firmness adjustment of 3.4, the curd is very firm and high in moisture during draining, milling, and salting.

In cheeses cut at the firmest coagulum, a large amount of whey is expelled after milling, affecting the salt retention in the curd. During salting, less salt is absorbed into the curd and more is lost into the press whey. This results in a significantly lower final salt content. (See Table 4, above).

A significantly (P<0.05) greater percentage of fat is recovered in the whey, press whey, and cheese when the milk coagulum is cut at a firmness adjustment of 3.4. Differences in fat recovery between firmness adjustments of 1.3 and 2.2 were not shown to be significant. The percentage of fat recovered in the cheese was 89.04%, 88.67%, and 87.31% for firmness adjustments of 1.3, 2.2., and 3.4, respectively. Fat recoveries for all firmness adjustments are lower than the predicted fat recovery of 93% by Van Slyke and Price, and 90.4% by a previous yield study using the same cheesemaking equipment and making full-fat Cheddar cheese. (Chen et al., 1995, in publication.)

It must be noted that the University of Wisconsin dairy uses wire knives to cut the coagulum, which may not cut as cleanly as sharp stainless steel knives in automated vats. Also, the curd/whey slurry is continuously stirred with broad paddles, causing mechanical breakage of the curd.

A total nitrogen balance was used to evaluate protein accountability in the cheese system because of the difficulties in measuring protein in cheese (not all of the nitrogen in cheese originates from casein). Differences in the percentage of nitrogen recovered in the whey and cheese were found to be insignificant. The percentage of total protein in the cheese for the three milk coagulum firmness levels at cutting, which includes casein and entrapped whey proteins, ranged from 75.2–75.6%. These numbers fall within the typical literature value range of 74–77%.

TABLE 7

Mean weights and percetage of fat and nitrogen recovery for 50% reduced-fat Cheddar cheese made with three milk coagulum firmness levels.

| Firmness adjustment | Whey | Press whey | Cheese | Total |
|---|---|---|---|---|
| Weights (kg) | | | | |
| 1.3 | 226[a1] | 4.0[c] | 19.4[b] | NA[2] |
| 2.2 | 224[b1] | 5.6[b] | 20.0[a] | NA |
| 3.4 | 222[c1] | 7.1[a] | 20.2[a] | NA |
| Statistics SEM | .3 | .3 | .07 | |
| P-value | .0001 | .0001 | .0001 | |
| LSD | 1 | .9 | .2 | |
| Fat Recovery (%) | | | | |
| 1.3 | 11.05[b] | .49[b] | 89.04[a] | 100.58 |
| 2.2 | 11.20[b] | .61[b] | 88.67[a] | 100.48 |
| 3.4 | 12.17[a] | .76[a] | 87.31[b] | 100.24 |
| Statistics SEM | .21 | .043 | .26 | .3 |
| P-value | .004 | .02 | .0007 | .71 |
| LSD | .64 | .13 | .78 | .89 |
| Nitrogen Recovery (%) | | | | |
| 1.3 | 25.23 | .45[c] | 75.55 | 101.23 |
| 2.2 | 24.67 | .62[b] | 75.38 | 100.67 |
| 3.4 | 24.85 | .80[a] | 75.23 | 100.87 |
| Statistics SEM | .20 | .036 | .30 | .22 |
| P-value | .17 | .0001 | .74 | .23 |
| LSD | .61 | .11 | .98 | .67 |

TABLE 7-continued

Mean weights and percetage of fat and nitrogen recovery for 50% reduced-fat Cheddar cheese made with three milk coagulum firmness levels.

| Firmness adjustment | Whey | Press whey | Cheese | Total |
|---|---|---|---|---|

[a,b,c]Means in the same column having different superscripts are significantly different by (P < .05) based on least significant difference (LSD).
[1]kg whey = kg milk minus kg press whey minus kg cheese.
[2]Not applicable.

A trend toward a increased nitrogen lose in the press whey as the firmness adjustment of the milk coagulum increased was noted. There was no difference in the nitrogen concentration of the press whey samples, but a higher percentage nitrogen recovery in the press whey exists because of the greater volume of whey expelled by the softer curd during pressing. The sum of the percentage of nitrogen recovered in the whey and press whey is 25.68, 25.29, and 25.65 for firmness adjustments of 1.3, 2.2, and 3.4, respectively. Overall, no differences were seen in the percentage of protein recovered in the cheese or lost in the whey.

The R value represents the non-fat solids in the cheese, which may include lactic acid, lactose, salt, whey proteins, and any differences in casein recovery (since all treatments assumed 96% casein recovery). No significant differences were found between R values of 1.174, 1.170, and 1.164, for firmness adjustment of 1.3, 2.2, and 3.4, respectively. R values that are equal, may not necessarily have the same balance of non-fat solid components. However, if differences in cheese moisture are not large (less than 4%), non-fat solids components are generally similar.

To summarize, cutting the milk coagulum at the firmest level significantly lowered the percentage of fat in the cheese, but did not affect the percentage of protein or the solids-non-fat recovery.

While not being bound to any particular mechanism, it is believed that the reduced fat loss into the whey is caused by the delicate curds formed by cutting at a firmer coagulum. To elaborate, the main reason for syneresis during cheesemaking is the rearrangement of the network of paracasein micelles. The network must deform locally to form new interactions. This rearranges the protein network to a more compact form having less entrapped moisture. The longer set time implies the presence of a finer milk coagulum network. During this time, the coagulum is constrained and unable to shrink because it is adhered to the walls of the vessel in which it was formed. As the coagulum becomes increasingly firm, it can withstand greater disturbance without exhibiting syneresis. As a consequence, the local deformations which give rise to syneresis are slowed. Thus, as an ultimate consequence, the firmer milk coagulum results in decreased syneresis of the curd upon cutting, which results in a firm, yet more fragile curd. These more fragile curds are easily shattered during cooking, thereby resulting in higher fat and fine losses into the whey.

Cheese Yield

Actual cheese yield results are in Table 8. Cheese yield significantly increased when the cheeses were cut at firmness adjustments of 2.2 (8.02%) and 3.4 (8.09%) over 1.3 (7.78%). This can be attributed to the increased moisture retained in the cheeses.

As noted in Table 8, the estimated yields using the present process for the manufacture of Cheddar cheese indicate that the present process would increase cheese production approximately 1500 kg/day for a plant processing 500,000 kg of milk per day. Assuming a wholesale price of $3.30 per kg for Cheddar, this translates to an increased gross earnings potential of $5,115 per day, or more than $1.8 million per year.

TABLE 8

Actual cheese yield and estimates of the financial impact of differences in Cheddar cheese yield for cutting milk coagulum at different firmness adjustment levels in 50% reduced-fat Cheddar for a plant processing 500,000 kg milk per day.

| Firmness adjustment | Actual percent cheese yield | kg cheese/d | Increase in kg/d from firmness adjustment 1.3 | $/day[1] |
|---|---|---|---|---|
| 1.3 | 7.78[b] | 38900 | NA | NA |
| 2.2 | 8.02[a] | 40100 | 1200 | $3960 |
| 3.4 | 8.09[a] | 40450 | 1500 | $5115 |
| Statistics SEM | .0052 | | | |
| P value | .36 | | | |
| LSD | .015 | | | |

[a,b]Means in the same column having different superscripts are significantly different by (P < .05) based on least significant difference (LSD).
[1]Assuming a wholesale cost of Cheddar $3.30/kg ($1.50/lb).

Sensory Evaluation

Results of the descriptive taste panels at 3 and 6 months, as described above, are found in Table 9.

No differences in Cheddar flavor intensity were noted between cheeses cut a different firmness adjustment levels throughout aging. However, significant differences (P<0.05) were noted in the acid flavor intensity, the body, and the body breakdown at 3 and 6 months, and bitter and off flavor intensity at 6 months of aging.

As noted above, the cheeses cut at the firmer milk coagulum levels were significantly lower in pH and the cheese panelists were able to accurately detect acidity differences as small as a tenth of a pH unit. Throughout aging the cheeses cut at the firmness adjustments of 2.2 and 3.4 were softer and less curdy, with the largest differences being detected at 3 months of age. For example, at 3 months, the control cheeses (firmness adjustment 1.3) were described as being slightly firm and slightly curdy, whereas the cheeses cut at firmness adjustments of 2.2 and 3.4 were rated as being neither soft nor firm in body, and neither curdy nor smooth in body breakdown.

Due to the improved body and texture of these cheeses, these cheeses were significantly (P<0.05) preferred. After 6 months of aging, the mean scores reflect significantly more bitter and off flavor intensity for the cheeses cut at a firmness adjustment of 3.4. However, taste panelists described these cheeses as only being slight bitter and having a slight off flavor intensity. There was no significant difference in overall flavor preference of cheeses at 3 and 6 months.

The experienced judges in this experiment generally described cheeses as neither like or dislike. Our past experience has demonstrated that a descriptive taste panel score of 4 (neither dislike or like) correlates with a consumer taste panel (150–200 tasters) score of 6 (like moderately).

TABLE 9

Descriptive Taste Panel results for of 50% reduced-fat Cheddar cheese cut at different milk coagulum firmness levels at 3 and 6 months of aging. Sixteen descriptive taste panels were conducted, each consisting of 6–10 experienced judges. Scores are the means of the 8 taste panels conducted at each age

| Firmness adjustment | Cheddar flavor intensity[1] | Acid flavor intensity[2] | Bitter flavor intensity[3] | Off flavor intensity[3] | Flavor preference[4] | Body[5] | Body breakdown[6] | Body preference[4] |
|---|---|---|---|---|---|---|---|---|
| Age of Cheese: 3 months | | | | | | | | |
| 1.3 | 2.4 | 3.1[c] | 1.7 | 2.4 | 3.9 | 5.2[a] | 2.7[b] | 3.4[b] |
| 2.2 | 2.5 | 3.5[b] | 1.7 | 2.3 | 4.0 | 4.0[b] | 3.7[a] | 4.0[a] |
| 3.4 | 2.5 | 3.8[a] | 1.9 | 2.7 | 3.8 | 3.7[b] | 4.0[a] | 4.3[a] |
| Statistics SEM | .1 | .1 | .1 | .1 | .1 | .1 | .1 | .1 |
| P-value | .60 | .0001 | .35 | .09 | .42 | .0001 | .001 | .0001 |
| LSD | .2 | .2 | .3 | 4 | .3 | .3 | .4 | .3 |
| Age of Cheese: 6 months | | | | | | | | |
| 1.3 | 3.2 | 3.5[b] | 2.3[b] | 2.8[b] | 3.8 | 4.4[a] | 3.8[b] | 4.1 |
| 2.2 | 3.5 | 4.0[a] | 2.3[b] | 2.9[b] | 3.9 | 3.8[b] | 4.5[a] | 4.4 |
| 3.4 | 3.4 | 4.1[a] | 2.6[a] | 3.2[a] | 3.8 | 4.0[b] | 4.3[a] | 4.3 |
| Statistics SEM | .1 | .1 | .1 | .1 | .1 | .1 | .1 | .2 |
| P-value | .27 | .02 | .05 | .001 | .57 | .0002 | .009 | .54 |
| LSD | .3 | .4 | .3 | .2 | .4 | .2 | .4 | .5 |

[a,b,c]Means in the same column having different superscripts are significantly different by (P < .05) based on least significant difference (LSD).
[1]Cheddar flavor intensity: 2 = very mild, 3 = mild, 4 = mild to medium.
[2]Acid flavor intensity: 3 = ideal acid, 4 = slight acid
[3]Bitter and off flavor intensity: 1 = none, 2 = very slight, 3 = slight, 4 = slight to definite.
[4]Flavor and body preference: 3 = slightly dislike, 4 = neither like or dislike, 5 = slightly like
[5]Body: 3 = slight soft, 4 = neither soft nor firm, 5 slight firm
[6]Body Breakdown: 3 slight curdy, 4 neither curdy nor smooth, 5 slight smooth

EXAMPLES

The following examples are provided for illustrative purposes only to provide a further understanding of the presently described method for producing reduced-fat cheeses. It is understood that the examples are for illustration only, and do not limit the invention claimed herein in any manner.

Example 1: Influence of Drain and Mill pH

The physical and functional properties of any cheese are determined by several factors including composition, and the rate and extent of acid development during manufacture, particularly at the key point of whey removal (drain). Fundamentally, it is the concentration and integrity of the casein network or matrix that establishes these properties. The casein network is held together by hydrophobic and hydrophilic peptide bonds and ionic interactions of both amino acids and calcium phosphate between different strands of casein. Calcium is linked to phosphate molecules, which are chemically attached to the casein (organic phosphate), as well as to a complex of calcium phosphate (inorganic phosphate), citric acid, and other minerals.

Calcium phosphate also plays a major role in the buffering capacity of cheese and is easily dissolved by a decrease in pH. As the calcium phosphate is dissolved there is a weakening of the casein network and a loss of the buffering capacity of the cheese. The lower the pH at drain, the more calcium phosphate will be dissolved and lost in the whey during draining and pressing. The higher the pH at drain, the more calcium phosphate will be retained in the cheese.

Even though the pH may eventually drop during pressing, the dissolved calcium phosphate will remain within the cheese, and the buffering capacity of the cheese will not be lost. The buffering capacity is important to cheese because it helps control the final pH of the cheese. Conventional dogma holds that the more calcium, the firmer the cheese. However, under conditions of high acid or low pH, initially firm, curdy cheese will soften and become smoother with time as proteolysis occurs and calcium in the casein network "dissolves" allowing the curds to knit together.

This first example was conducted to determine the effects of rate of acid development and pH at draining and milling, critical manufacturing points. Composition, chemical changes, and sensory attributes were monitored. To achieve distinct rates of acid production two levels of starter culture were used: 2.0% for rapid acid development and 0.5% for slow acid development. The other parameters tested in this series were high and low curd pH at drain (6.4 and 6.1) and high and low curd pH at mill (5.8 and 5.4). The combination of these parameters resulted in eight manufacturing methods and these were tested in duplicate. The same starter was used to manufacture the 16 lots of cheese.

The target curd pH of 6.4 at drain using 2% starter was not achieved because the rate of acid production was too fast. The effect of rate of acid development at draining and milling on the length of the make schedule, the moisture content, and the pH at 3 months is given in Table 10. The sensory attributes for the cheeses made in this experiment are given in Tables 11 and 12. In sensory panels, 8 to 12 experienced cheese judges scored the various cheese attributes on a semi-structured hedonic scale. Scores were tallied and averaged.

The results are summarized as follows:

1. The manufacturing procedure that consistently produced the smoothest bodied cheese used the higher curd pH at drain and mill. These cheeses were also highest in moisture (42.7–44.0%). However, with the particular starter culture used in this trial, these cheeses became soft and weak bodied by 6 months.

2. Cheeses made with high curd pH at both drain and mill were consistently ranked lowest in off flavor intensity, and highest in Cheddar flavor intensity and preference, despite the amount of starter added. Cheddar flavor intensity was described as mild at 3 months and medium at 6 months.

3. High starter levels (2.0%) caused problems in addition to the difficulties with completing manufacturing steps at target drain and mill pH. The pH of some of the 2.0% starter level cheeses dropped to as low as 4.95 at 3 months (Table 10). Low pHs caused flavor and texture problems that adversely effected the quality of the cheese. Taste panelists described these cheeses as pronounced acid, dry and mealy. These cheeses also developed more bitterness and off flavors.

TABLE 10

Effect of Starter Culture Level, Drain pH and Mill pH on the length of the make schedule, moisture and pH of 33% Reduced Fat Cheddar.

| | Experimental Variables | | | | Results | | | |
|---|---|---|---|---|---|---|---|---|
| Treatment | Starter Level | Whey pH at Drain | Curd pH at Drain | Curd pH at Mill | Set to Mill (hours) | % Moisture | 3 month % Lactic Acid | 3 month pH |
| 1 | 2.0% | 6.21 | 6.03 | 5.73 | 1:53 | 42.65 | 1.79 | 5.00 |
| 2 | 2.0% | 6.21 | 6.06 | 5.41 | 2:18 | 42.60 | 1.80 | 4.94 |
| 3 | 2.0% | 6.12 | 5.79 | 5.60 | 2:12 | 41.52 | 1.67 | 4.94 |
| 4 | 2.0% | 6.08 | 5.78 | 5.38 | 2:25 | 41.64 | 1.71 | 4.90 |
| 5 | 0.5% | 6.49 | 6.38 | 5.79 | 2:58 | 43.99 | 1.79 | 5.03 |
| 6 | 0.5% | 6.48 | 6.37 | 5.39 | 4:02 | 41.63 | 1.72 | 5.03 |
| 7 | 0.5% | 6.29 | 6.13 | 5.79 | 3:10 | 41.68 | 1.58 | 5.15 |
| 8 | 0.5% | 6.31 | 6.10 | 5.39 | 4:09 | 39.63 | 1.56 | 5.13 |

TABLE 11

Effect of Starter Culture Level, Drain pH and Mill pH on the Sensory Attributes at 3 months.

| Treatment | Cheddar Flavor Intensity | Acid Flavor Intensity | Bitter Flavor Intensity | Off Flavor Intensity | Body Breakdown |
|---|---|---|---|---|---|
| 1 | 51 | 84 | 9 | 37 | 66 |
| 2 | 35 | 95 | 18 | 43 | 90 |

TABLE 11-continued

Effect of Starter Culture Level, Drain pH and Mill pH on the Sensory Attributes at 3 months.

| Treatment | Cheddar Flavor Intensity | Acid Flavor Intensity | Bitter Flavor Intensity | Off Flavor Intensity | Body Breakdown |
|---|---|---|---|---|---|
| 3 | 34 | 108 | 20 | 67 | 103 |
| 4 | 28 | 96 | 26 | 70 | 109 |
| 5 | 49 | 59 | 11 | 33 | 48 |
| 6 | 43 | 60 | 12 | 33 | 65 |
| 7 | 40 | 52 | 9 | 54 | 96 |
| 8 | 31 | 46 | 9 | 35 | 97 |

Flavor Intensity (Cheddar, Acid, Bitter, Off-Flavor)  0 Absent
150 Pronounced
Body Breakdown  0 Breaksdown Readily (Smooth)
150 Doesn't Breakdown Readily (Curdy)

TABLE 12

Effect of Starter Culture Level, Drain pH and Mill pH on the Sensory Attributes at 6 months.

| Treatment | Cheddar Flavor Intensity | Acid Flavor Intensity | Bitter Flavor Intensity | Off Flavor Intensity | Body Breakdown | Preference |
|---|---|---|---|---|---|---|
| 1 | 89 | 72 | 30 | 64 | 69 | 82 |
| 2 | 80 | 89 | 56 | 83 | 87 | 47 |
| 5 | 82 | 58 | 22 | 48 | 47 | 93 |
| 6 | 72 | 64 | 31 | 44 | 50 | 80 |

Flavor Intensity (Cheddar, Acid, Bitter, Off-Flavor)  0 Absent
150 Pronounced
Body Breakdown  0 Breaksdown Readily (Smooth)
150 Doesn't Breakdown Readily (Curdy)
Preference  0 Dislike
150 Like

TABLE 13

CDR Manufactured vs Store Purchased Reduced-Fat Cheddar

| Trt | Cheddar Flavor Intensity | Cheddar Flavor Quality | Acid Intensity | Off-flavor and Bitter Intensity | Body and Texture Preference | Overall Preference |
|---|---|---|---|---|---|---|
| CDR* | 99.6 | 86.7 | 82.1 | 58.5 | 98.0 | 94.7 |
| Lorraine Brand** | 33.7 | 27.9 | 60.8 | 116.0 | 29.5 | 27.1 |
| Alpine Lace** | 24.3 | 19.9 | 64.2 | 126.2 | 15.9 | 12.9 |
| Kraft** | 37.2 | 43.7 | 35.6 | 63.7 | 65.2 | 41.2 |

Comments:

CDR: unclean, firm, pasty
Lorraine Brand: pronounced bitter, slight meaty, diacetyl, sweet mushy, soft, weak
Alpine Lace: pronounced bitter, unclean gel-like, mushy, weak
Kraft: stale casein flavor, salty gel-like, curdy
*CDR make schedule. 2.0% Starter, High drain, High mill. Age of cheese: 7 months old.
**Age of cheese: unknown.
Attributes: Cheddar Flavor Intensity  0 None,
150 Pronounced

TABLE 13-continued

CDR Manufactured vs Store Purchased Reduced-Fat Cheddar

| Trt | Cheddar Flavor Intensity | Cheddar Flavor Quality | Acid Intensity | Off-flavor and Bitter Intensity | Body and Texture Preference | Overall Preference |
|---|---|---|---|---|---|---|
| | Cheddar Flavor Quality | | | | 0 Worst, 150 Best | |
| | Acid Intensity | | | | 0 None, 150 Pronounced | |
| | Off-flavor and Bitter Intensity | | | | 0 None, 150 Pronounced | |
| | Body & Texture Preference | | | | 0 Dislike, 150 Like | |
| | Overall Preference | | | | 0 Dislike, 150 Like | |

4. A blind taste panel comparing our best cheese from this trial to commercial reduced-fat Cheddar cheese showed the test (CDR—Center for Dairy Research) 33% reduced-fat Cheddar cheese to be ranked higher than the retail cheeses in Cheddar flavor quality, flavor intensity, body and preference (Table 13).

5. A high pH at drain increased buffer capacity in the cheese. This was evident when comparing the curd pH at drain, level of lactic acid and pH at 3 months (Table 10).

This example shows that the best 33% reduced-fat Cheddar cheese were manufactured with the combination of high drain and mill pH. These cheeses were superior in body, had greater Cheddar flavor intensity and the least unclean and bitter flavor development. Because faster acid development has adverse effects, a 0.5% or a starter level that would produce an equivalent rate of acid production is beneficial. Manufacturing cheese with rapid acid production while maintaining target parameters of high drain and mill pH is extremely difficult, especially on a large commercial scale.

Example 2: Influence of Wash Treatment on Body and Flavor

Industry uses a cold water wash to increase the moisture content of reduced-fat cheese and to concomitantly remove lactose and lactic acid. When the curd is soaking, lactose, lactic acid, and other soluble components are leached from the curd. This insures that the high moisture cheeses will not become too acidic. To demonstrate the consequences of a wash treatment on the body and flavor of reduced fat cheese, a direct comparison was made between cheeses made with a no-wash curd procedure and cheeses made with a washed curd technique at two temperatures, 72° F. and 95° F. Observations on the effect of different starter cultures were also made.

The results are summarized as follows:

1. Rinsing the milled curd with cold water (72° F. final curd/water temperature) significantly increased cheese moisture from 43.8 to 46.9% and cheese yield from 8.3 to 8.7% (Table 14). Rinsing the curd with warm water (95° F. final curd/water temperature, roughly the same temperature as the curd) did not affect moisture or yield.

2. Due to the high pH at draining, milling and salting, 33% reduced fat Cheddar cheese contained substantial amounts of residual lactose at Day 1 of age. No-wash cheeses had between 0.4 to 1.0% lactose and washed cheeses between 0.4 to 0.5% lactose. Although levels of residual sugar were reduced in washed cheeses, the choice of starter culture strongly influenced the level of residual lactose at Day 1 and the rate at which lactose was fermented in the cheeses (Table 15).

3. As a consequence of the fermentation of residual lactose, total lactic acid increased until all sugars were depleted. The total lactic acid content in all no-washed curd cheese ranged from 1.6 to 1.7% and for all washed curd cheeses between 1.4 to 1.5% (FIG. 1).

TABLE 14

Effect of Cold and Warm Water Curd Washing on Moisture and Yield in 33% Reduced-Fat Cheddar

| Wash Treatment | Number of Replicates | % Yield | % Moisture | % MNFS |
| --- | --- | --- | --- | --- |
| No-wash | 10 | 8.28 | 43.75 | 53.16 |
| 72° F. wash | 6 | 8.72 | 46.85 | 56.65 |
| 95° F. wash | 3 | 8.20 | 43.67 | 53.16 |

% MNFS = Moisture in the Non-Fat Solid Phase $$= \frac{\% \text{ Moisture}}{(100 - \% \text{ Fat})} \times 100$$

TABLE 15

Residual Lactose for No-wash vs Wash Treatments for Three Starter Cultures

| | | % Residual Lactose Age of Cheese (months) | | |
| --- | --- | --- | --- | --- |
| Starter | Treatment | 0 | 1.5 | 3 |
| HAZ* | No-wash | 0.45 | 0.24 | 0.17 |
| CC19 | No-wash | 0.59 | 0.06 | 0.05 |
| | 72° F. wash | 0.51 | 0.01 | 0.04 |
| D11 | No-wash | 0.98 | 0.07 | 0.03 |
| | 72° F. wash | 0.62 | 0.08 | 0.01 |
| | 95° F. wash | 0.63 | 0.01 | 0.00 |
| 44 | No-wash | 0.70 | 0.26 | 0.12 |
| | 72° F. wash | 0.48 | 0.09 | 0.05 |
| | 95° F. wash | 0.43 | 0.01 | 0.00 |

*Starter Culture used in Trial #1.

Figure 2:
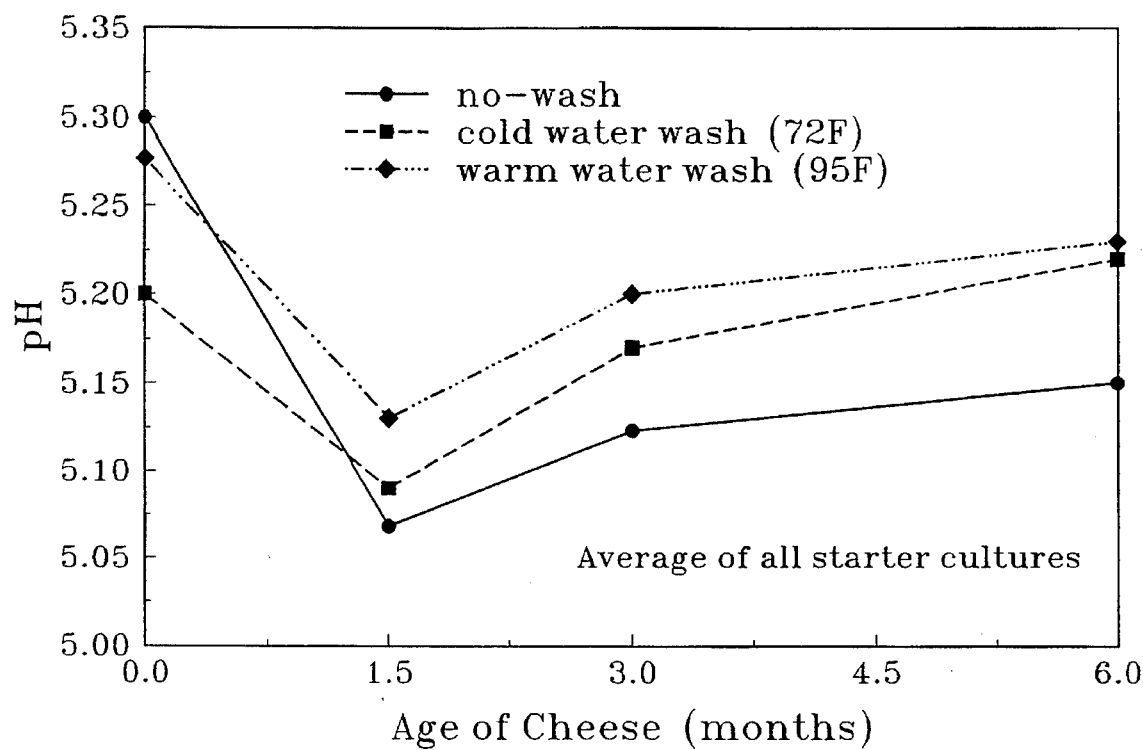
FIG. 2 is a graph illustrating a comparison of pH for washed-curd and no-washed curd reduced-fat Cheddar cheeses over time.

4. At 6 months, the average pH of the no-wash curd and washed curd cheeses were 5.15 and 5.25 respectively. As the cheeses aged, the pH increased at a faster rate in washed curd cheeses than in the no-wash curd cheeses. As noted above, this is likely due to the lower buffer capacity cheese as a result of leaching of calcium phosphate during the wash treatment or increased proteolysis of the higher moisture cheeses (FIG. 2).

Figure 3:
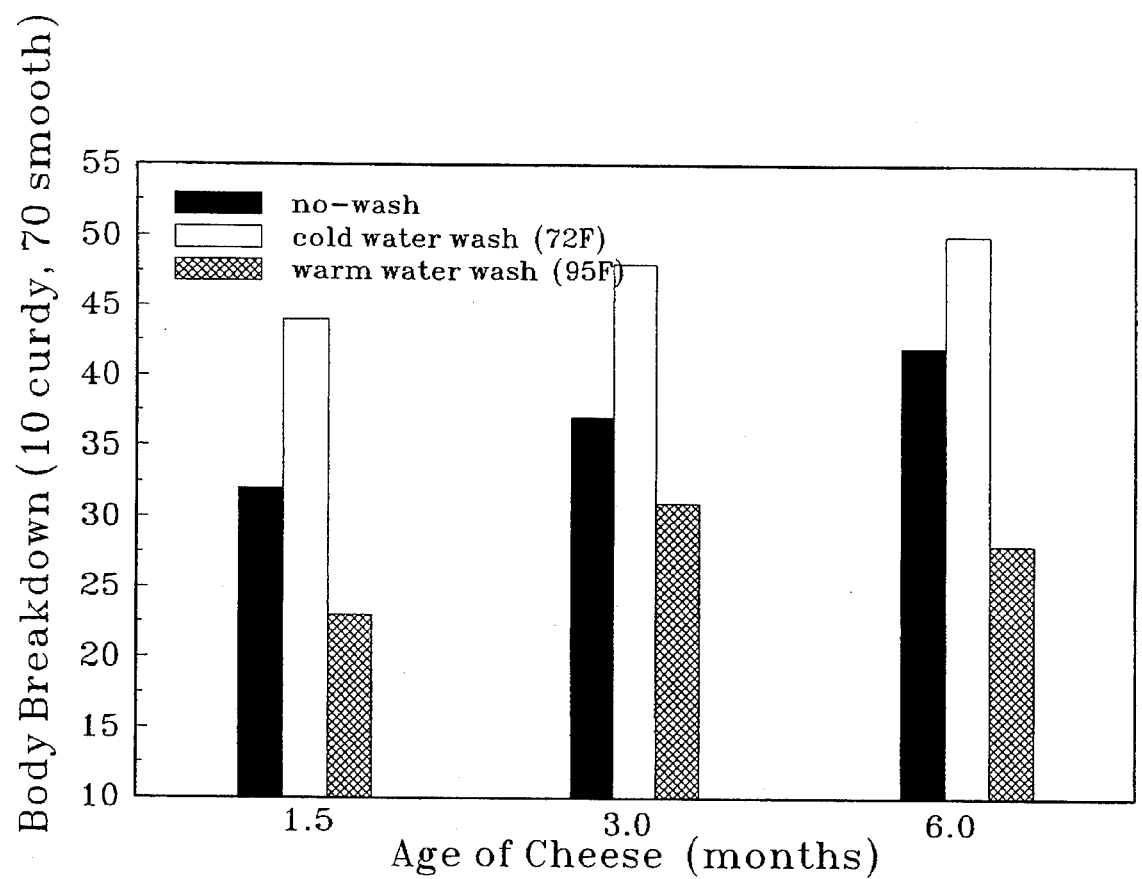
FIG. 3 is a graph illustrating a comparison of body breakdown for washed-curd and no-washed curd reduced-fat Cheddar cheeses over time.
Figure 4:
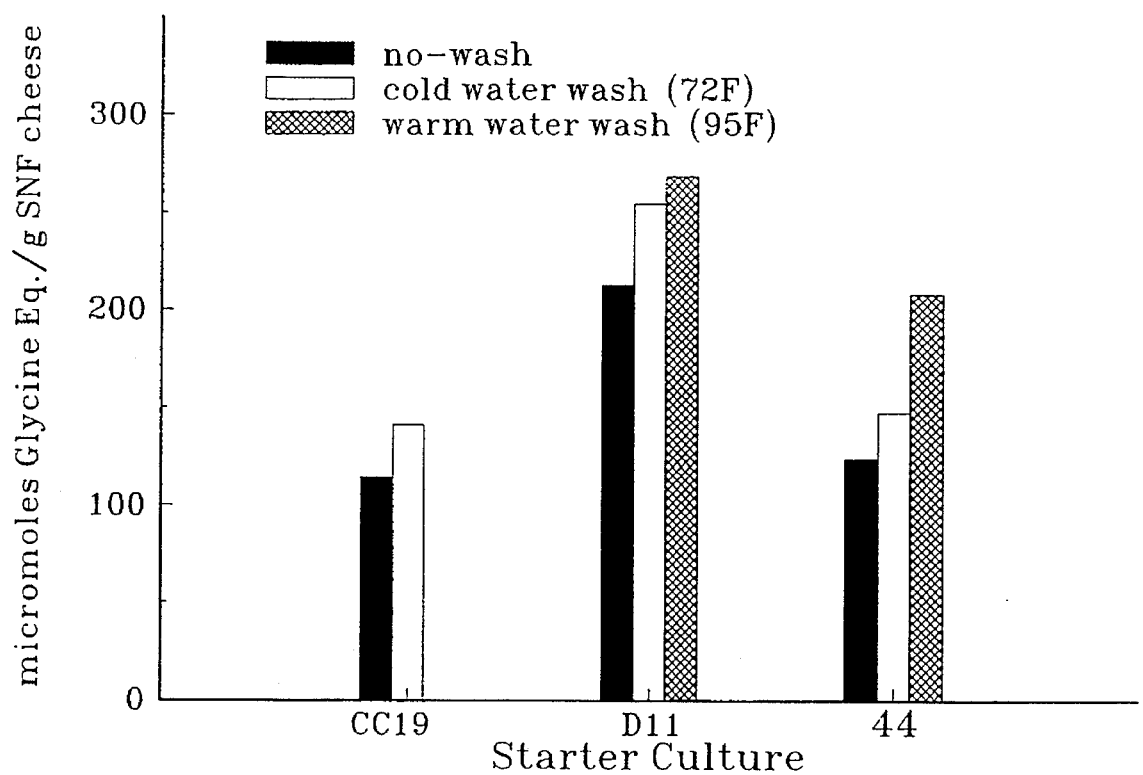
FIG. 4 is a graph illustrating a comparison of PTA-soluble nitrogen at 6 months for washed-curd and no-washed curd reduced-fat Cheddar cheeses.
Figure 5:
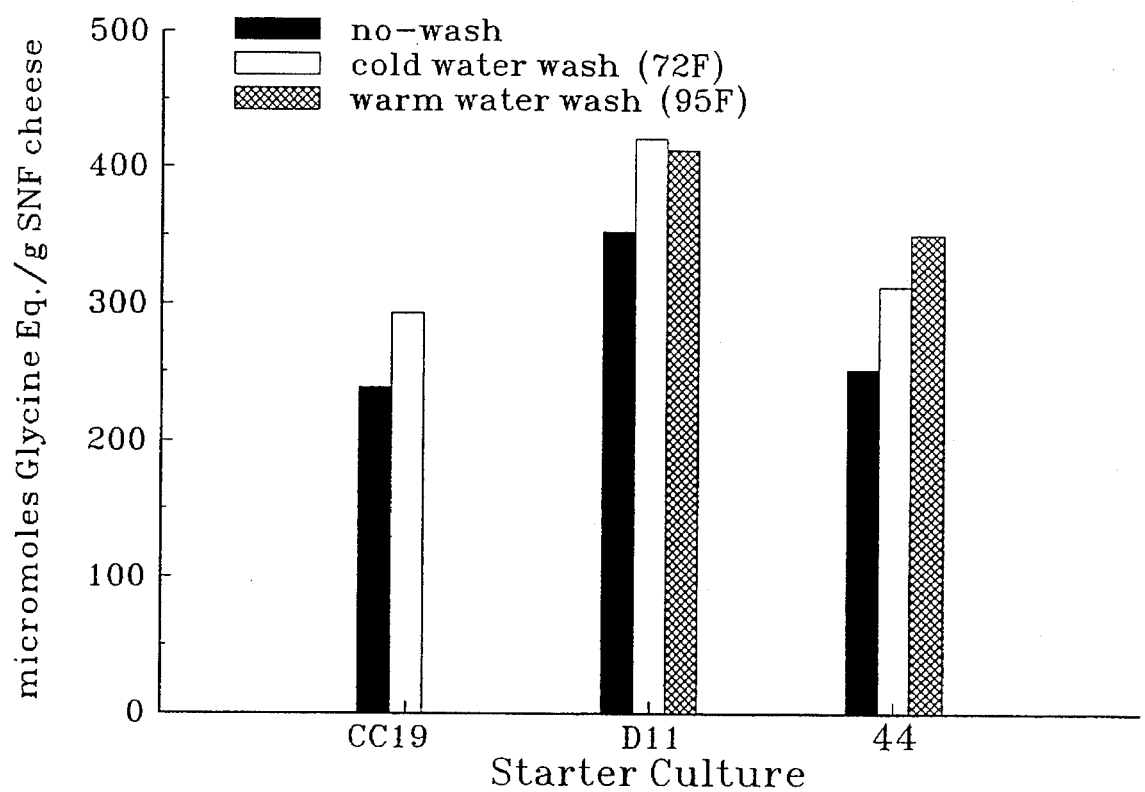
FIG. 5 is a graph illustrating a comparison of TCA-soluble nitrogen at 6 months for washed-curd and no-washed curd reduced-fat Cheddar cheeses.

5. The cold water washed-curd Cheddar, with its higher moisture content, was softer and smoother in body than the no-wash or warm water washed curd Cheddar (FIG. 3). Water molecules affect the protein matrix by physically separating casein strands, thus the higher the moisture content, the more disrupted (or weaker) the cheese protein matrix will be. As the cold water washed cheeses aged, they became increasingly softer and by 6 months were described as too soft, pasty or weak. Softening was directly related to proteolysis and moisture content (FIGS. 4 and 5, and Table 14). At equal moisture levels, as in the case of the no-wash and warm water wash treatments, cheeses were curdy and firm at 1.5 months. The no-wash cheese became less curdy and softer with age, taking 2–3 months to develop acceptable body. At 6 months no-wash cheeses were considered smooth, but not too soft or pasty like the cold washed curd cheeses. The body of the warm water wash cheese did not change over time; these cheeses remained curdy and firm throughout aging.

6. Cold and warm water washed curd cheeses developed off-flavors more rapidly and to a greater intensity than did the no-washed curd cheeses. Although the wash treatment had a greater impact, the intensity of the off-flavors appeared to be related to the particular starter used. For example, culture 44 produced an extreme meaty-brothy off-flavor in washed curd cheese, but did not produce meaty-brothy off-flavor to the same intensity in the no-washed curd cheeses (Table 16).

TABLE 16

Flavor Profile of Culture 44 in 33% Reduced-Fat Cheddar for Different Wash Treatment Make Schedules

| Treatment | 1½ months | 3 months | 6 months |
| --- | --- | --- | --- |
| no-wash | acid/sour utensil unclean | mild slight sweet | grain-like flavor slight meaty |
| 72° F. wash | variable | definite meaty | pronounced meaty |
| 95° F. wash | bland | definite meaty | definite meaty |

Figure 6:
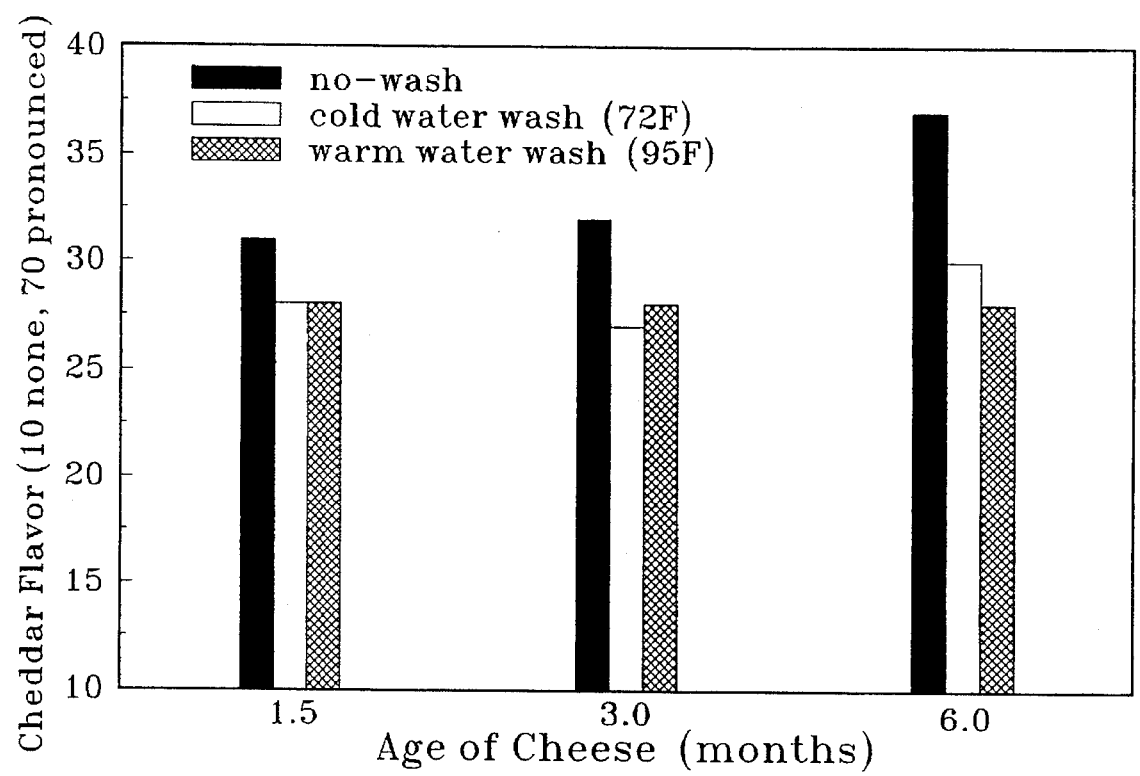
FIG. 6 is a graph illustrating a comparison of Cheddar flavor intensity over time for washed-curd and no-washed curd reduced-fat Cheddar cheeses.
Figure 7:
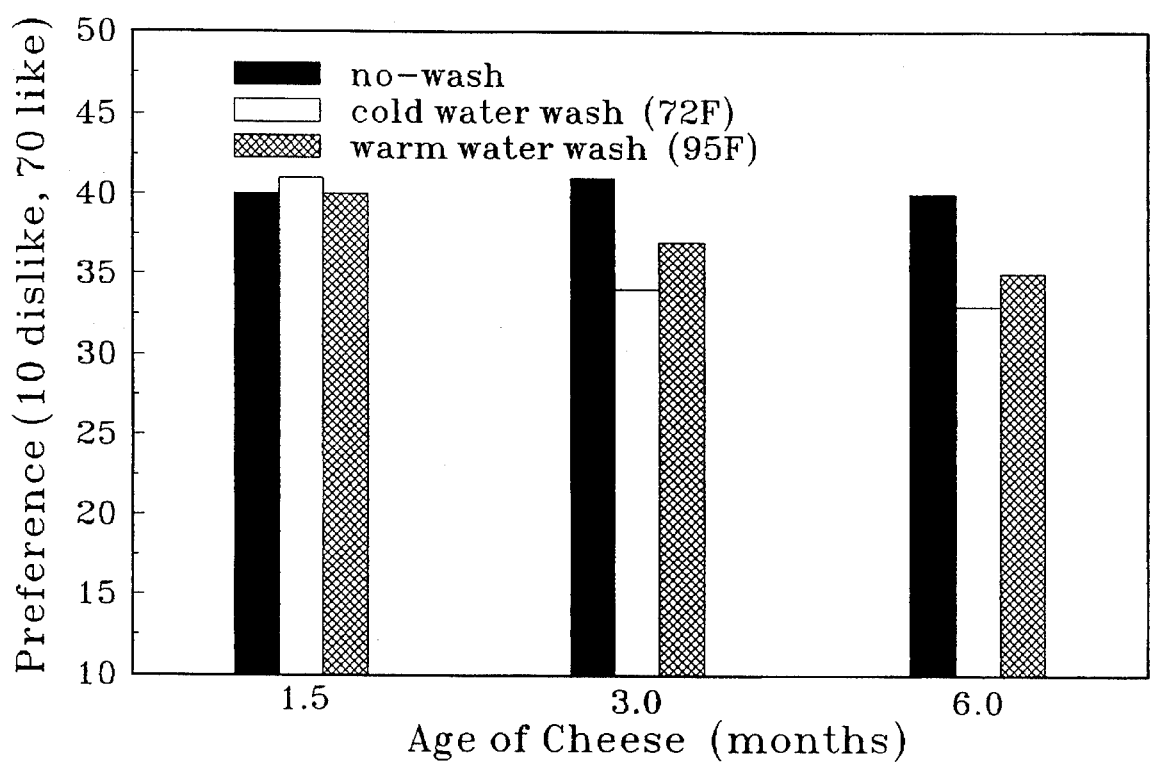
FIG. 7 is a graph illustrating a comparison of flavor preference over time for washed-curd and no-washed curd reduced-fat Cheddar cheeses.

7. No-washed curd cheeses developed a stronger Cheddar flavor intensity than did the washed curd cheeses (FIG. 6). In young cheeses there was no preference between no-washed, cold and warm water washed cheeses. As the cheeses aged the no=washed cheeses were significantly more preferred (FIG. 7).

Most, if not all, reduced fat cheese produced in the United States is manufactured with a curd wash, rinse or soak. It is apparent that this practice produces Cheddar cheese with interior flavor and body characteristics compared to a lower moisture no-wash reduced fat Cheddar cheese. A young cold water washed curd Cheddar (manufacturing make schedule that results in higher moisture and increased yield) has a softer, smoother body and can be free of flavor defects other than blandness. However, these cheeses quickly deteriorate into weak or pasty bodied cheeses that are highly unclean or have objectionable meaty-brothy flavors. The lower moisture-no-wash cheese, although initially too firm, curdy and slightly acid, was consistently more preferred from 3 and 6 months of age. For stronger flavored 33% reduced-fat Cheddar cheese with a longer shelf-life, with both better flavor and body characteristics, a no-wash manufacturing schedule is highly preferred over a manufacturing schedule involving a wash procedure.

Example 3: Starter Culture Selection

We evaluated the performance of three starter cultures, CC19—*Lactococcus lactis* subsp. *lactis*, D11—*Lactococcus lactis* subsp. *cremoris*, and 44—a blend of *Lactococcus lactis* subsp. *lactis* and *cremoris*. These starter cultures produced distinctly different flavors in no-washed curd 33% reduced-fat Cheddar cheese, but all were acceptable (Table 17).

It is apparent from the example with different wash treatments that not all slow mesophilic starter cultures are suitable for use in washed curd cheese, even though they produce quality no-washed cheeses. We do not know the characteristics of the starters that contribute to this discrepancy.

Figure 8:
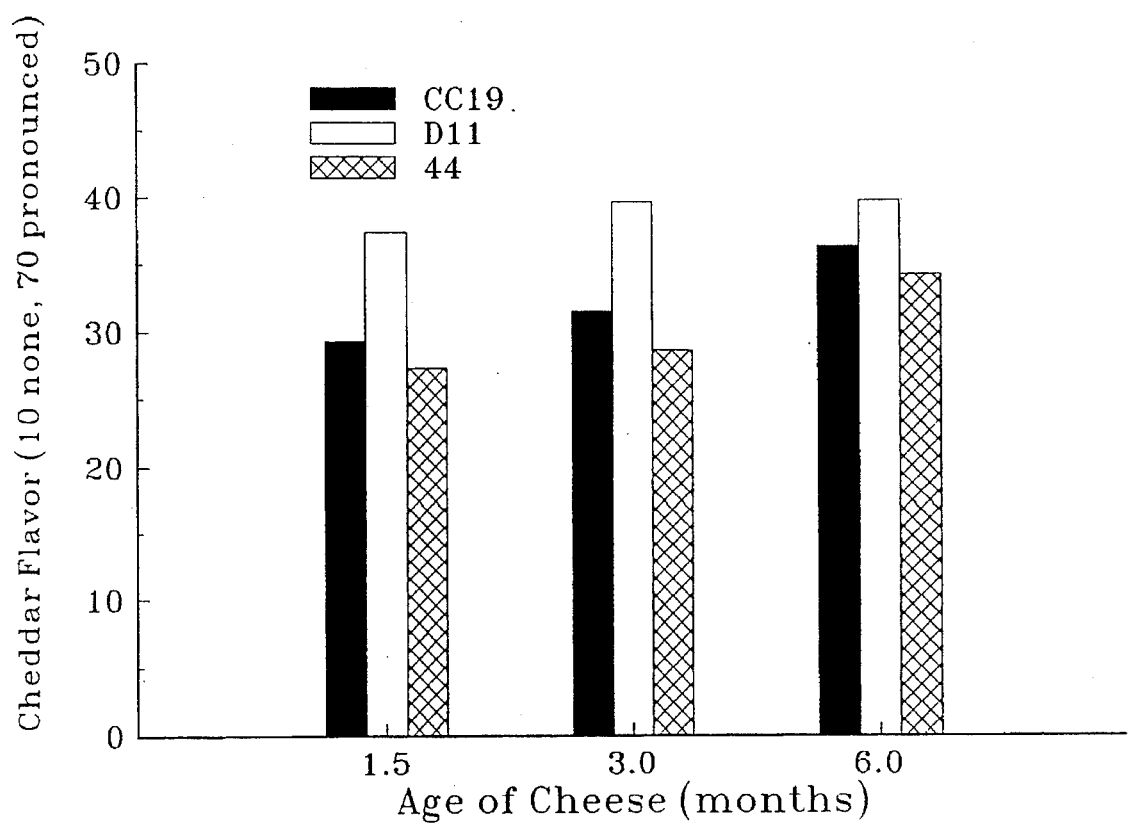
FIG. 8 is a graph illustrating a comparison of mesophilic culture Cheddar flavor intensity over time for no-wash reduced-fat Cheddar cheese.
Figure 9:
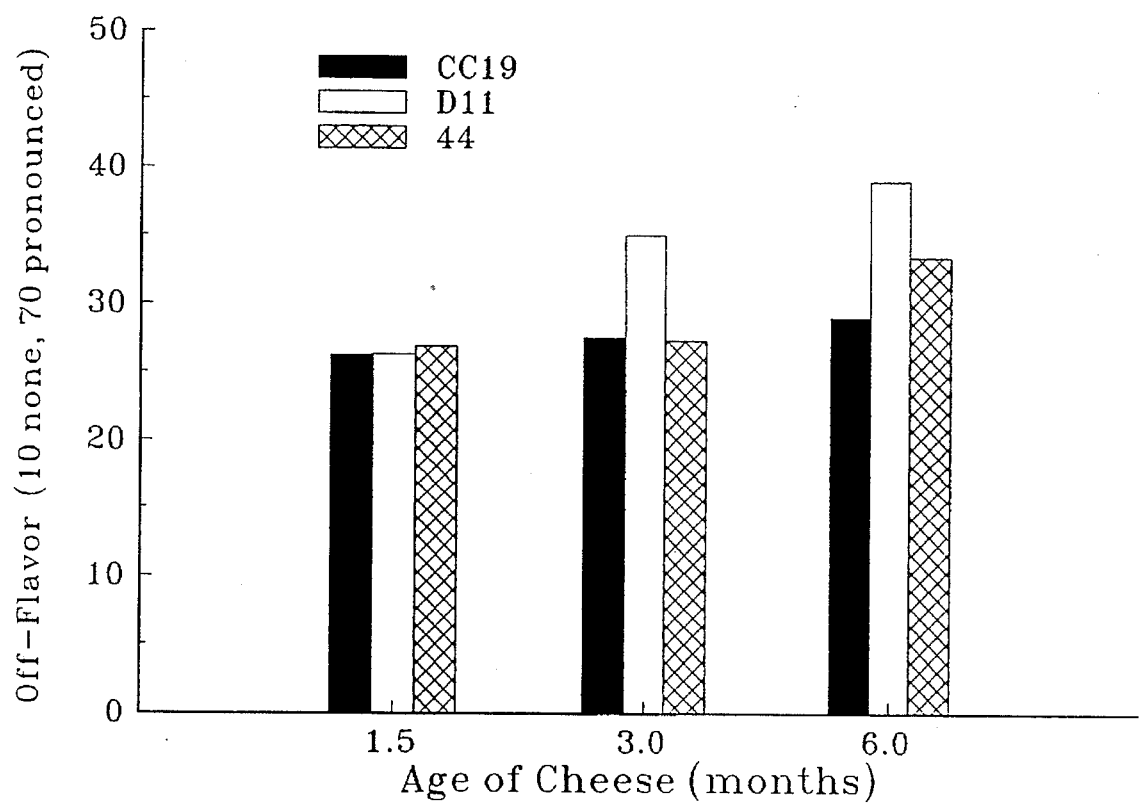
FIG. 9 is a graph illustrating a comparison of off-flavor intensity over time for no-wash reduced-fat Cheddars made from different mesophilic starter cultures.
Figure 10:
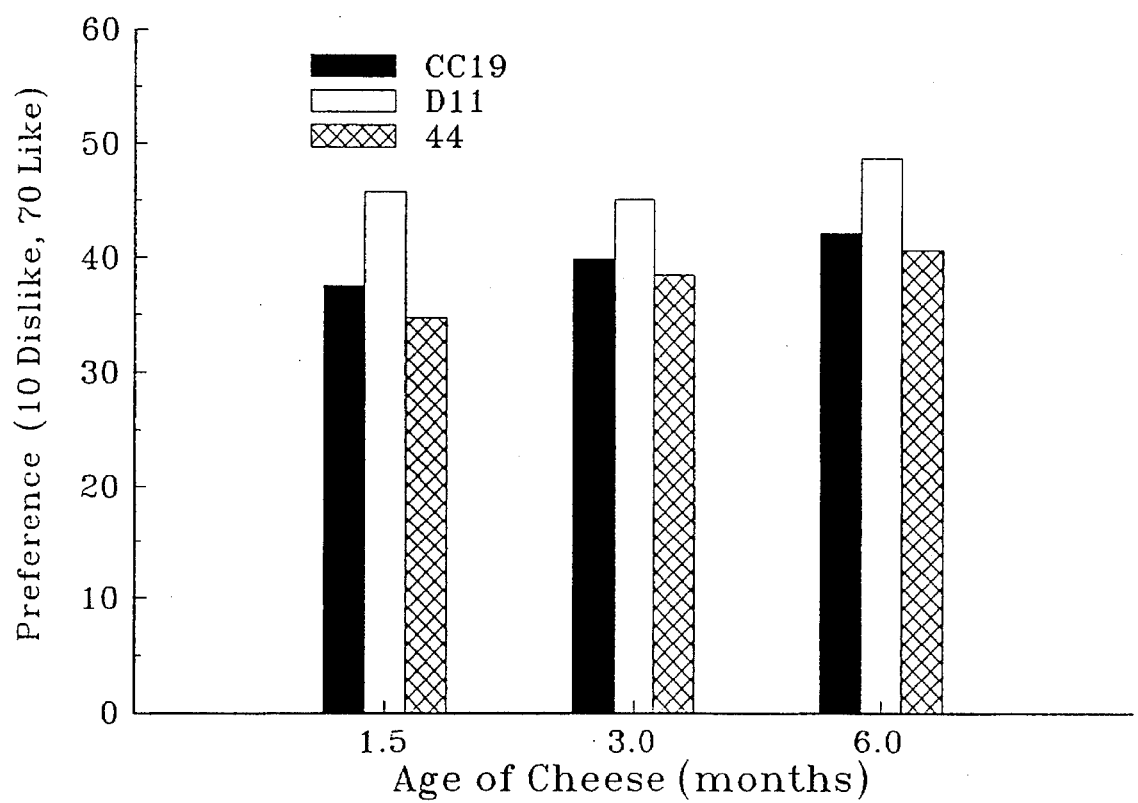
FIG. 10 is a graph illustrating a comparison of flavor preference over time for no-wash reduced-fat Cheddars made from different mesophilic starter cultures.

The results are summarized as follows:

1. In the no-washed curd make schedule, judges described the 6 month old D11 cheeses as Cheddary in flavor with a definite meaty-brothy character. Despite the meaty-brothy flavor, D11 cheeses were significantly preferred over CC19 and 44 cheeses. D11 cheeses produced the most intense flavors, both desirable and undesirable (FIGS. 8, 9, 10).

Figure 11:
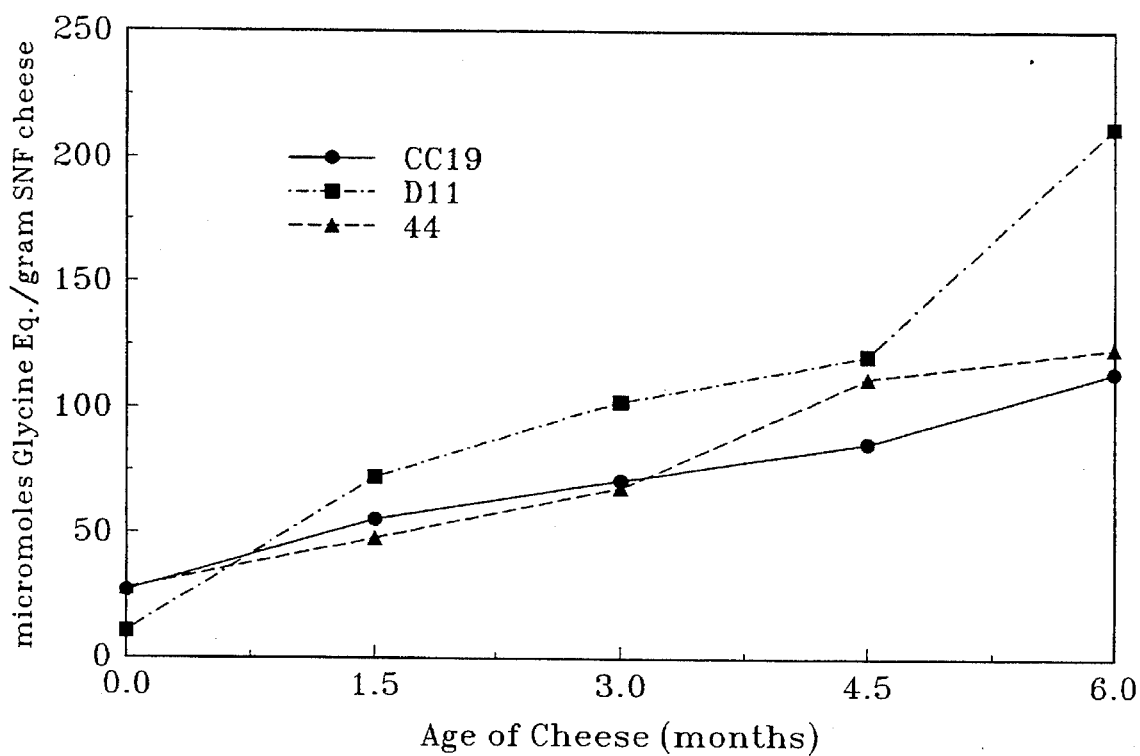
FIG. 11 is a graph illustrating a comparison of PTA-soluble nitrogen over time of no-wash reduced-fat Cheddars made using various mesophilic starter cultures.
Figure 12:
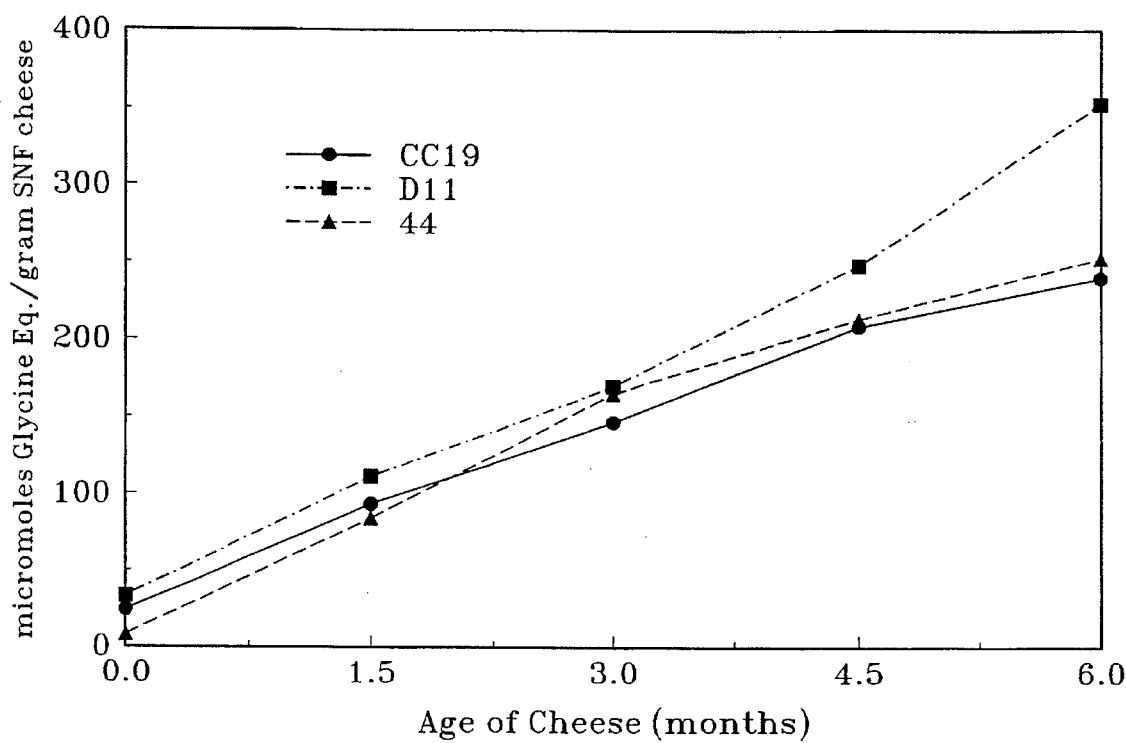
FIG. 12 is a graph illustrating a comparison of PTA-soluble nitrogen over time of no-wash, reduced-fat Cheddars made using various mesophilic starter cultures.

2. The degree of proteolysis can be followed by TCA (trichloroacetic acid) and PTA (phosphotungstic acid) soluble nitrogen levels in the cheese as it ages. The TCA soluble nitrogen fraction contains protein breakdown products that include amino acids to medium length peptides, while the PTA soluble nitrogen fraction, a subset of TCA, contains only small peptides (5 amino acids or less) and free amino acids. Cheeses made with D11 were 22% higher in TCA and 30% higher in PTA than cheeses made with CC19 or 44 (FIGS. 11, 12). However, cultures D11 and 44 had similar enzyme activities. Culture CC19 had 5 times less aminopeptidase activity and 2.5 times mores caseinolytic activity than cultures D11 and 44 (Table 9). The differences in enzyme activities explain why D11 had higher PTA and TCA soluble nitrogen levels. We cannot explain why culture 44 had an enzyme activity more similar to culture D11, but had a soluble nitrogen profile more similar to culture CC19. The intense flavors produced by D11 can be explained by the high peptidase and aminopeptidase activity of the starter and the subsequent high soluble nitrogen levels in the cheese. D11 had the highest levels of peptides and free amino acids. Peptides and amino acids can be correlated with both desirable and undesirable flavors.

TABLE 17

Sensory Evaluation Comments of 33% Reduced-Fat Cheddar made from 3 Mesophilic Cultures Using a No-wash Make Schedule

| Culture | 1½ months | 3 months | 6 months |
|---|---|---|---|
| CC19 | acid/sour utensil unclean | acid/sour mild cheese | heated/sulphur slight bitter slight meaty/brothy |
| D11 | slight meaty/ brothy | mild Cheddar slight meaty/ brothy | Cheddary definite meaty/brothy |
| 44 | acid/sour utensil unclean | slightly sweet mild cheese | grain-like flavor slight meaty/brothy |
| | | | slight bitter |
| CC19 | n = 6 *Lactococcus lactis* supbs. *lactis* Rhône Poulenc Marschall Products | | |
| D11 | n = 2 *Lactococcus lactis* subsp. *cremoris* Rhône Poulenc Marschall Products | | |
| 44 | n = 2 blend of *Lactococcus lactis* subsp. *lactis* and *Lactococcus lactis* subsp. *cremoris* Chris Hansen's Laboratory | | |

3. Culture 44 produced the most intensely off-flavored washed curd cheese and had the highest aminopeptidase activity for the substrates tested (FIG. 5). The total enzyme activity of culture 44 did not apparently carry over into the cheese. D11 had a slightly lower aminopeptidase activity in vivo but produced more TCA and PTA soluble nitrogen in the cheese (FIGS. 11 and 12).

4. Culture CC19, had the lowest aminopeptidase activity, but had the highest caseinolytic activity. This suggests a potential build-up of hydrophobic peptides which are known to cause bitter flavors in cheese. At 6 months judges did detect a slight bitter flavor in cheeses made with culture CC19. Culture CC19 had the highest peptidase activity toward the dipeptide ala-met. The release of methionine and subsequent metabolism of this sulphur containing amino acid may be a possible cause for the definite sulphur flavor noted in the cheese.

We cannot use the enzyme activity profile of a starter culture or soluble nitrogen levels in a cheese alone as an index to predict the quality of 33% reduced-fat Cheddar produced from a particular starter. However, chemical analysis can help explain trends or characteristics in cheese. It appears that a good starter culture for production of 33% reduced-fat Cheddar should preferably have the following properties: slow acid production, low in caseinolytic activity and high dipeptidase and aminopeptidase activity.

Example 4: Production of 50% Reduced-fat Cheddar Cheese Using the Present Process Table 18 summarizes a cheese making schedule, including composite pH's at the various stages, for 48 vats of cheddar cheese produced according to the present invention. The milk coagulum for this example was cut at the firmest level noted above.

TABLE 18

Schedule of manufacture for 48 vats of 50% reduced-fat Cheddar cheese.

| | Time | pH | |
|---|---|---|---|
| Add starter | 0:00 | 6.60$^m$ | 1.25% D11 (Marshall) grown in LF media |
| Add CaCl$_2$ | 0:15 | | 3.0 ounces/1000 pounds |
| Add Rennet | 0:20 | 6.54$^m$ | 2.25 ounces/1000 pounds |
| Cut (⅜") | 1:10 | 6.53$^w$ | |
| Start heat | 1:20 | | |
| Reach cook temp/ and drain | 1:45 | 6.48$^w$ 6.37$^c$ | 100° F. |
| Cut curd mass/ and Cheddar | 2:05 | 6.28$^c$ | m = milk pH w = whey pH c = curd pH |
| Cheddar 2 high | 2:30 | 6.20$^c$ | milk fat = 1.30% |
| Mill curd | 4:05 | 5.95$^c$ | |
| Salt curd | 4:20 | 5.86$^c$ | .275% weight of milk |
| Hoop | 4:40 | 5.78$^c$ | |
| Press (25 psi) | 4:55 | | 5 hours |

Table 19 shows the average composition for the 48 vats of cheese described immediately above.

TABLE 19

Average composition for 48 vats of 50% reduced-fat Cheddar 48.8% moisture
13.4% fat
1.68% salt
pH at 1 day = 5.3        pH at 1 month = 5.0

For ease of comparison between cheeses made with milk coagulum cut at standard firmness, and reduced-fat cheeses made according to the present invention, Table 20 shows a comparison of 50% reduced-fat Cheddar cheese made according to conventional cheesemaking techniques (left-hand column), and 50% reduced-fat Cheddar cheese made according to the present process (middle and right-hand columns).

In Table 20, TA refers to titratable acidity of the whey, "w" refers to whey, "c" to curd or cheese. As is clearly shown by this table, the TA of the curd made according to the present invention is significantly lower than cheese made by conventional techniques. (0.195 and 0.175 compared to 0.21)

The present invention is not limited to the embodiments described above, but encompasses all such embodiments falling within the scope of the following claims.

TABLE 20

| Operation | Vat 1 (010794-1) | | Vat 2 (010794-2) | | Vat 3 (010794-3) | |
|---|---|---|---|---|---|---|
| | Time | pH or TA | Time | pH or TA | Time | pH or TA |
| Milk - 550 lbs | Control | | Set Time + 20 min | | Set Time + 40 min | |
| Heat 110°, Cool 90° F. | | TA 0.16 | | TA 0.16 | | TA 0.16 |
| | | pH 6.63 | | pH 6.62 | | pH 6.62 |
| Add Starter | 0:00 | Temp 90.0° F. | 0:00 | Temp 90.0° F. | 0:00 | Temp 90.2° F. |
| Rhône-Poulenc D11 (LF media) | | TA 0.18 | | TA 0.175 | | TA 0.178 |
| 1.25% or 3121 gms | | pH 6.57 | | pH 6.57 | | pH 6.57 |
| Add CaCl$_2$ | 0:40 | | 0:15 | | 0:00 | |
| 3.0 oz/1000 lbs or 49 mls | | | | | | |
| Add Coagulant | 0:45 | Temp 90.2° F. | 0:20 | Temp 89.9° F. | 0:05 | Temp 90.2° F. |
| Chymax, Pfizer | | TA 0.18 | | TA 0.175 | | TA 0.18 |
| 1.15 oz/1000 lbs or 19 mls | | pH 6.55 | | pH 6.55 | | pH 6.55 |
| 1st Coagulation | | | | | | |
| Cut | | TA 0.11 | | TA 0.11 | | TA 0.11 |
| ⅜" knives | | pH 6.51 | | pH 6.51 | | pH 6.51 |
| Start Cook | 1:20 | Temp 89.0° F. | 1:15 | Temp 89.2° F. | 1:25 | Temp 89.1° F. |
| Reach Cook Temp and Drain | 1:45 | Temp 99.8° F. | 1:35 | Temp 99.7° F. | 1:50 | Temp 99.5° F. |
| | | TA 0.115 | | TA 0.115 | | TA 0.115 |
| | | w-pH 6.46 | | w-pH 6.47 | | w-pH 6.45 |
| | | c-pH 6.38 | | c-pH 6.38 | | c-pH 6.38 |
| Cut & Turn | 2:05 | TA 0.12 | 1:55 | TA 0.12 | 2:10 | TA 0.12 |
| | | c-pH 6.31 | | c-pH 6.33 | | c-pH 6.31 |
| Stack 2 High | 2:30 | TA 0.13 | 2:20 | TA 0.125 | 2:35 | TA — |
| | | c-pH 6.26 | | c-pH 6.29 | | c-pH 6.28 |
| Mill | 3:45 | TA 0.21 | 3:15 | TA 0.175 | 3:25 | TA 0.195 |
| | | c-pH 5.92 | | c-pH 5.93 | | c-pH 5.93 |
| Add Salt | 4:00 | TA — | 3:30 | TA — | 3:40 | TA — |
| 2.75 lbs/1000 lbs or 687 gms | | c-pH 5.69 | | c-pH 5.88 | | c-pH 5.80 |
| Hoop | 4:20 | c-pH 5.64 | 3:50 | c-pH 5.73 | 4:00 | c-pH 5.74 |
| Press | | | | | | |
| In | 4:35 | | 4:15 | | 4:20 | |
| Out | 8:20 | | 7:40 | | 7:05 | |
| Total Time in Press | 3 hours 45 minutes | | 3 hours 25 minutes | | 2 hours 45 minutes | |
| Additional Data: | 3:15 | c-pH 6.02 | | | 3:00 | c-pH 6.00 |

What is claimed is:

1. A process for the production of reduced-fat cheese comprising:
   a) ripening milk with a starter culture to yield cheese milk;
   b) coagulating the cheese milk by adding a coagulant to yield a coagulum;
   c) cutting the coagulum at a firmness level not less than about firmness adjustment 2.2, wherein firmness adjustment is a unitless number equal to cutting time divided by maximum coagulation rate of the cheese milk;
   d) cooking the cut coagulum to form curds and whey;
   e) separating the curds from the whey, and proceeding directly to mill and salt the curds in the absence of any washing or rinsing of the curds in water;
   f) milling the curds;
   g) salting the curds at a pH not less than about 5.80; and
   h) pressing the curds.

2. The process according to claim 1, wherein in step c) the coagulum is cut at firmness adjustment between about 2.2 and about 3.4.

3. The process according to claim 1, wherein in step a) the milk is ripened with a mesophilic starter culture.

4. The process according to claim 3, wherein the milk is ripened with a starter culture selected from the group consisting of Lactococcus lactis subsp. lactis, Lactococcus lactis subsp. cremoris, and mixtures thereof.

5. The process according to claim 4, wherein the milk is ripened with Lactococcus lactis subsp. cremoris.

6. The process according to claim 1, wherein in step g) the curds are salted at a pH between about pH 5.80 and about pH 5.90.

7. The process according to claim 1, wherein in step f) titratable acidity falls within a range between about 0.175% and 0.200%.

8. The process according to claim 1, wherein the cheese produced is reduced-fat Cheddar cheese, and further including the step of cheddaring the curds subsequent to step e) and prior to step f).

9. The process according to claim 8, wherein the reduced-fat Cheddar cheese produced has a total fat content not greater than about 15.25%.

10. The process according to claim 9, wherein the reduced-fat Cheddar cheese produced has a total fat content not greater than about 14.20%.

11. The process according to claim 1, wherein in step c) the coagulum is cut 45 to 60 minutes after the addition of coagulant.

12. A process for the production of reduced-fat Cheddar cheese comprising:
   a) ripening milk with a starter culture to yield cheese milk;
   b) coagulating the cheese milk by adding a coagulant to yield a coagulum;
   c) cutting the coagulum at a firmness level not less than about firmness adjustment 2.2, wherein firmness adjustment is a unitless number equal to cutting time divided by maximum coagulation rate of the cheese milk;

d) cooking the cut coagulum to form curds and whey;

e) separating the curds from the whey, and proceeding directly to cheddar, mill, and salt the curds in the absence of any washing or rinsing of the curds in water;

f) cheddaring the curds;

g) milling the curds;

h) salting the curds at a pH not less than about 5.80; and i) pressing the curds.

13. The process according to claim 12, wherein in step c) the coagulum is cut at firmness adjustment between about 2.2 and about 3.4.

14. The process according to claim 12, wherein in step a) the milk is ripened with a mesophilic starter culture.

15. The process according to claim 14, wherein the milk is ripened with a starter culture selected from the group consisting of *Lactococcus lactis* subsp. *lactis, Lactococcus lactis* subsp. *cremoris,* and mixtures thereof.

16. The process according to claim 15, wherein the milk is ripened with *Lactococcus lactis* subsp. *cremoris*.

17. The process according to claim 12, wherein in step h) the curds are salted at a pH between about pH 5.80 and about pH 5.90.

18. The process according to claim 12, wherein in step g) titratable acidity falls within a range between about 0.175% and 0.200%.

19. The process according to claim 12, wherein the reduced-fat Cheddar cheese produced has a total fat content not greater than about 15.25%.

20. The process according to claim 19, wherein the reduced-fat Cheddar cheese produced has a total fat content not greater than about 14.20%.

21. The process according to claim 12, wherein in step c) the coagulum is cut 45 to 60 minutes after the addition of coagulant.

22. A process for the production of reduced-fat Cheddar cheese consisting essentially of:

a) ripening milk with a mesophilic starter culture to yield cheese milk;

b) coagulating the cheese milk by adding a coagulant to yield a coagulum;

c) cutting the coagulum at a firmness level between about firmness adjustment 2.2 and firmness adjustment 3.4, wherein firmness adjustment is a unitless number equal to cutting time divided by maximum coagulation rate of the cheese milk;

d) cooking the cut coagulum to form curds and whey;

e) separating the curds from the whey, and proceeding directly to cheddar, mill, and salt the curds in the absence of any washing or rinsing of the curds in water;

f) cheddaring the curds;

g) milling the curds;

h) salting the curds at a pH not less than about 5.80; and i) pressing the curds.

* * * * *